United States Patent
Inayoshi

(10) Patent No.: US 8,935,857 B2
(45) Date of Patent: Jan. 20, 2015

(54) CUTTING TOOLS

(75) Inventor: Hirotomo Inayoshi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 573 days.

(21) Appl. No.: 13/038,890

(22) Filed: Mar. 2, 2011

(65) Prior Publication Data

US 2011/0214303 A1  Sep. 8, 2011

(30) Foreign Application Priority Data

Mar. 4, 2010  (JP) .................................. 2010-047924

(51) Int. Cl.
*B27G 19/00* (2006.01)
*B27G 19/04* (2006.01)
*B23D 45/16* (2006.01)
*B23D 47/12* (2006.01)

(52) U.S. Cl.
CPC ............... *B27G 19/04* (2013.01); *B23D 45/16* (2013.01); *B23D 47/12* (2013.01)
USPC .................... 30/390; 30/388; 30/516; 83/169

(58) Field of Classification Search
USPC ........... 30/376, 377, 380, 381, 388–391, 516; 83/520, 58–68, 168–171
See application file for complete search history.

(56) References Cited

U.S. PATENT DOCUMENTS

| | | | | |
|---|---|---|---|---|
| 5,579,584 | A * | 12/1996 | Hoffman | 30/391 |
| 5,699,705 | A * | 12/1997 | Sibbet | 83/13 |
| 6,853,300 | B2 * | 2/2005 | Kuan | 340/565 |
| 6,981,779 | B2 * | 1/2006 | Fukuoka | 362/119 |
| 7,096,587 | B2 * | 8/2006 | Onose et al. | 30/390 |
| 7,918,030 | B2 * | 4/2011 | Fukuoka | 30/388 |
| 8,056,243 | B2 * | 11/2011 | Sargeant et al. | 30/377 |
| 2002/0170399 | A1 * | 11/2002 | Gass et al. | 83/62.1 |
| 2005/0160608 | A1 * | 7/2005 | Tanimoto et al. | 30/391 |
| 2008/0244910 | A1 * | 10/2008 | Patel | 30/123 |
| 2010/0236370 | A1 * | 9/2010 | Hassenboehler, Jr. | 83/478 |

FOREIGN PATENT DOCUMENTS

| | | |
|---|---|---|
| JP | A-9-164801 | 6/1997 |
| JP | A 2004-155097 | 6/2004 |
| JP | A-2009-61737 | 3/2009 |

OTHER PUBLICATIONS

JP09164501 translation; Oda Takashi, Jun. 24, 1997.*
Japanese Patent Office, Notification of Reasons for Rejection mailed Oct. 22, 2013 in Japanese Patent Application No. 2010-047924 w/English-language Translation.

* cited by examiner

*Primary Examiner* — Laura M Lee
(74) *Attorney, Agent, or Firm* — Oliff PLC

(57) ABSTRACT

A cutting tool includes a tool unit including an electric motor, a rotary cutting blade rotatably driven by the electric motor, and a blade case covering at least apart of the rotary cutting blade. An electric component is disposed within the blade case at a position capable of being cooled by a flow of air produced by the rotation of the rotary cutting blade.

21 Claims, 18 Drawing Sheets

CUTTING TOOLS

This application claims priority to Japanese patent application serial number 2010-47924, the contents of which are incorporated herein by reference.

The present invention relates to cutting tools, in particular cutting tools having handles, such as portable circular saws.

DESCRIPTION OF THE RELATED ART

In general, this kind of cutting tools has a construction, in which a tool unit having an electric motor and a circular cutting blade rotatably driven by the electric motor is supported on an upper surface of a base that is adapted to be placed on a workpiece. The tool unit is moved in a cutting direction, so that the lower portion of the cutting blade protruding downwardly from the base cuts into the workpiece.

An upper portion of the rotary cutting blade is normally covered by a blade case and the electric motor is disposed on a lateral side of the blade case. A handle is positioned to extend upward or rearward from the upper portion of the electric motor. In the case that a relatively lager space is provided within a space of the handle, electric components such as a power source circuit board and a control circuit board (controller) for the electric motor are stored with in this space. As disclosed in Japanese Laid-Open Patent Publication No. 2004-155097, there has been proposed to cool the electric components by using a cooling air that cools the electric motor.

However, as disclosed in the above publication, in order to cool the electric components by using the motor cooling air, it is necessary to make change of design to the space that receives a baffle plate, etc. In addition, it is necessary to provide a complexly configured air introduction passage extending to the electric components. Therefore, it was difficult to effectively cool the electric components.

Therefore, there is a need in the art for effectively cooling an electric component or electric components of a cutting tool.

SUMMARY OF THE INVENTION

According to the present teaching, A cutting tool includes a tool unit including an electric motor, a rotary cutting blade rotatably driven by the electric motor, and a blade case covering at least apart of the rotary cutting blade. An electric component is disposed within the blade case at a position capable of being cooled by a flow of air produced by the rotation of the rotary cutting blade.

DETAILED DESCRIPTION OF THE INVENTION

Figure 1:
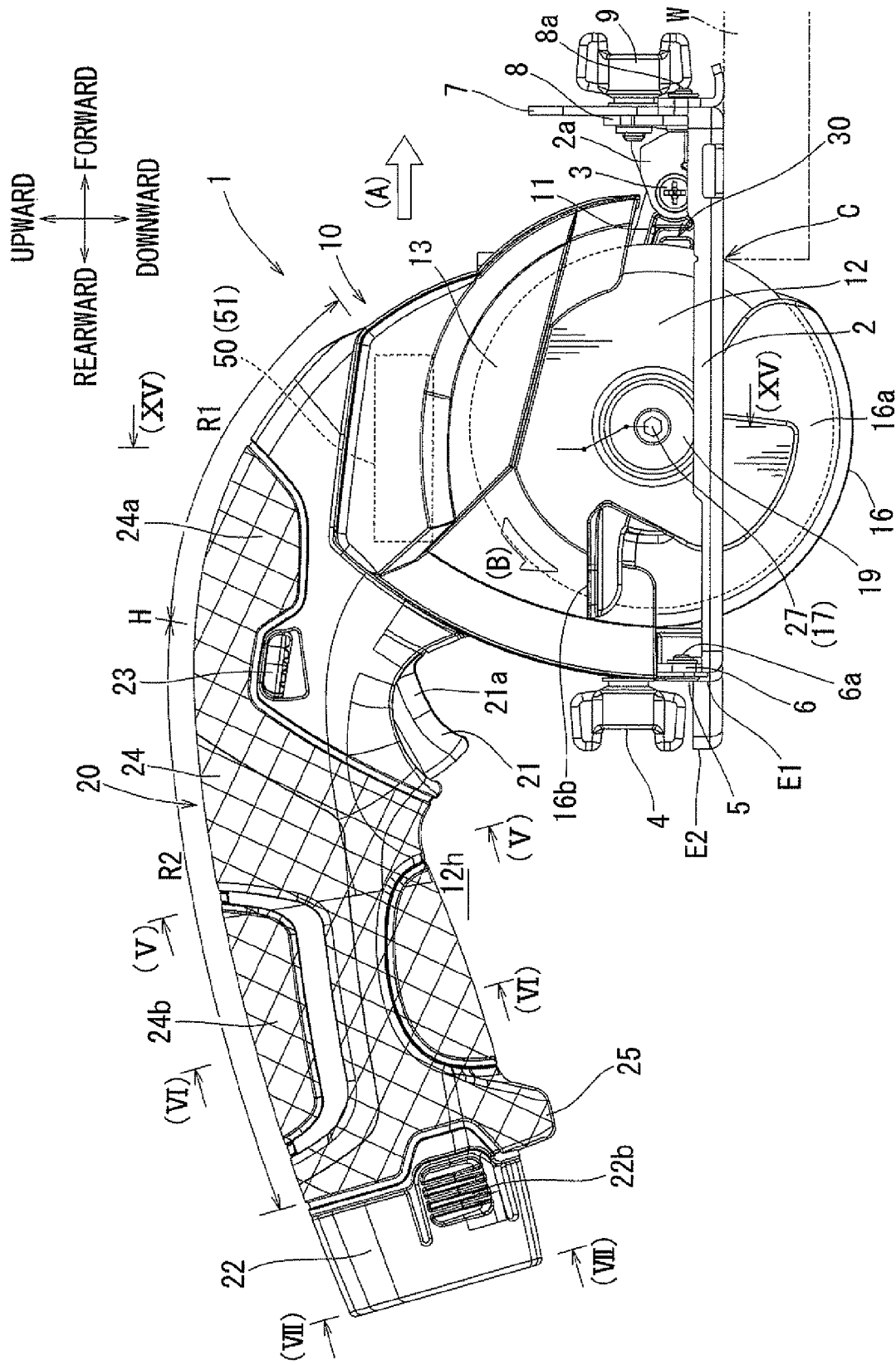
FIG. 1 is a right side view of a cutting tool according to an example.

Each of the additional features and teachings disclosed above and below may be utilized separately or in conjunction with other features and teachings to provide improved cutting tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a cutting tool includes a base for placing on a workpiece, a tool unit supported on an upper side of the base and having an electric motor, a rotary cutting blade rotatably driven by the electric motor, and a blade case covering an upper portion of the rotary cutting blade. An electric component is disposed within the blade case and cooled by a flow of air produced by the rotation of the rotary cutting blade.

Therefore, the space within the blade case can be used for storing the electric component that is necessary to be cooled. In addition, the electric component can be effectively cooled by the flow of air produced by the rotation of the rotary cutting blade.

Further, because the space within the blade case can be used, it is possible to easily provide an air introduction passage within this space for introducing the flow of air toward the electric component although such an air introduction passage may be omitted.

Thus, because the flow of air produced by the rotation of the rotary cutting blade is used for cooling the electric component, the electric component can be effectively cooled without being subjected to substantial restriction by a limitation of space as in the case that the electric component is disposed within a handle.

The electric component may be disposed within an upper portion of the blade case. This arrangement is advantageous in comparison with an arrangement within a lower portion of the blade case, because it is possible to ensure the visibility of a cutting point where a workpiece is cut by the rotary cutting blade.

A cooling air used for cooling the electric motor may be used also for cooling the electric component. Therefore, the electric component can be further efficiently cooled.

The cutting tool may further include an electric component storage compartment storing the electric component, a fan producing a flow of cooling air for cooling the electric motor, a motor lock lever operable for locking rotation of an output shaft of the electric motor, a spring biasing the motor lock lever toward an unlock direction; and a spring storage compartment storing the spring and disposed between the electric component storage compartment and the fan. A window is formed in the spring storage compartment and communicates between inside of the electric component storage space and the inside of the spring storage compartment, so that a flow of the cooling air produced by the fan is introduced into the electric component storage compartment via the window.

With this arrangement, the spring storage compartment can be used for providing a flow path of air for cooling the electric component by the motor cooling air.

An example will be now described with reference to FIGS. 1 to 20. Referring to FIGS. 1 to 4, there is shown a cutting tool 1 as a whole. In this example, the cutting tool 1 is configured as a portable circular saw that is a cutting device having a relatively small size and a relatively lightweight. In order to perform a cutting operation using the cutting tool 1, an operator holds the cutting tool 1 and moves it along a workpiece W (see FIG. 4).

First, the general construction of the cutting tool 1 will be described. The cutting tool 1 has a flat plate-like base 2 for placing on the workpiece W and a tool unit 10 supported on the base 2. In order to perform the cutting operation, the operator may be positioned on the left side of the cutting tool 1 as viewed in FIG. 1. More specifically, moving the cutting tool 1 rightward (indicated by an outline (A) in FIG. 1) as viewed in FIG. 1 can cut the workpiece W. In the following explanation, unless otherwise noted, a cutting direction that is a direction for moving the cutting tool 1 will be referred to as a forward direction and a direction toward the operator with respect to the cutting tool 1 will be referred to as a rearward direction. In addition, in the following explanation, right and left directions used in connection with the parts and various constructions of the cutting tool 1 mean right and left directions with respect to the operator.

The tool unit 10 has a support arm 11 on its front side. The support arm 11 is vertically pivotally joined to a bracket 2a via a support shaft 3. The bracket 2a is mounted to the upper surface of the base 2. Therefore, the tool unit 10 is vertically pivotally supported on the base 2 via the bracket 2a. By changing the vertically pivoted position of the tool unit 10 relative to the base 2, it is possible to adjust a cutting depth into the workpiece W by a rotary cutting blade 12 of the tool unit 10. The tool unit 10 can be fixed at a desired vertically pivoted position by tightening a manually operable screw 4 mounted to the rear end portion of the tool unit 10 as will be explained later. The base 2 supports the tool unit 10 such that the tool unit 10 can pivot also in the lateral direction (left and right directions). Therefore, it is possible to perform a bevel cutting operation with the tool unit 10 inclined leftward or rightward from a vertical position.

Figure 9:
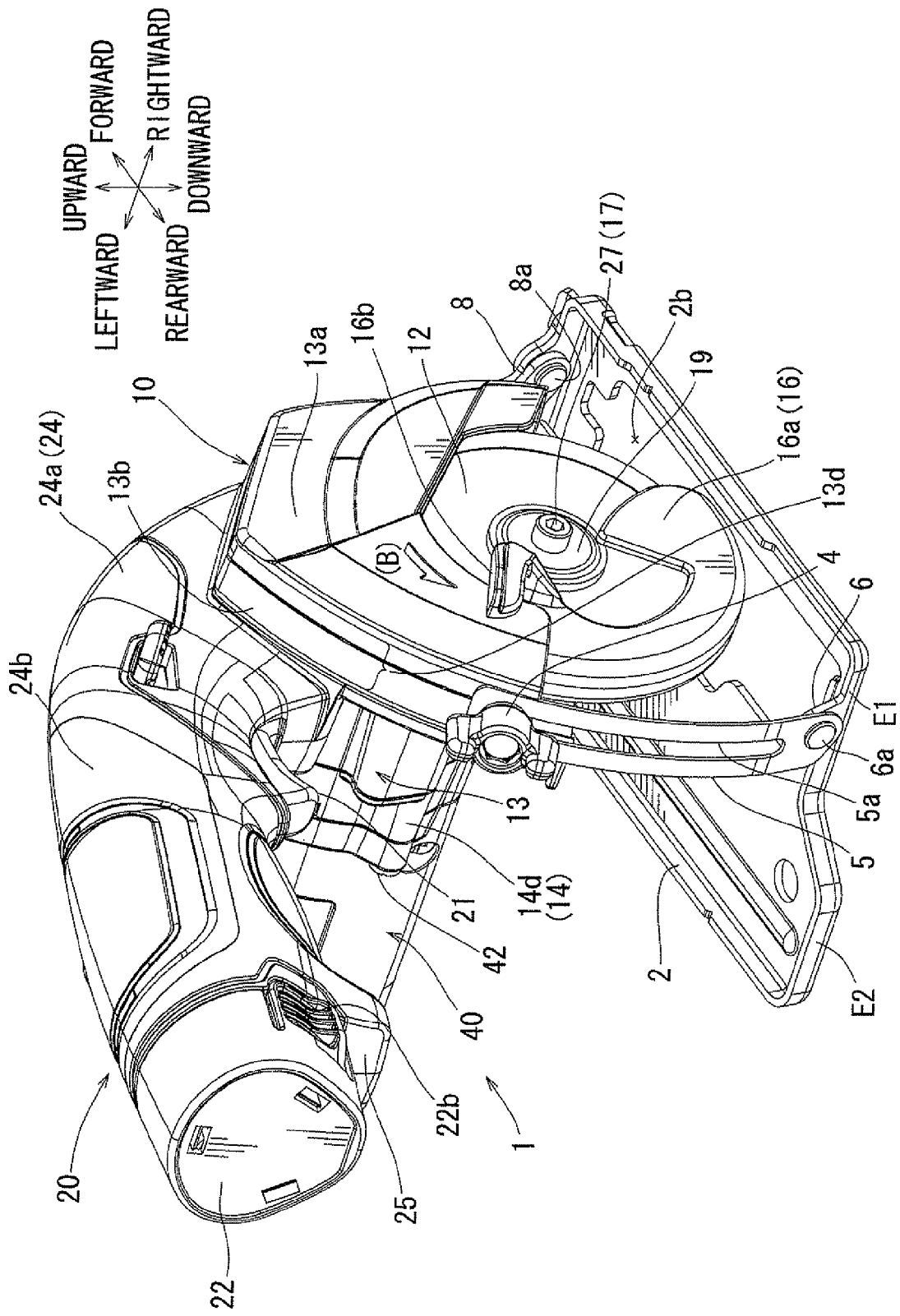
FIG. 9 is a perspective view of the cutting tool as viewed from a rear upper side and showing the state where the tool unit is positioned at its uppermost position for setting a minimum cutting depth.
Figure 11:
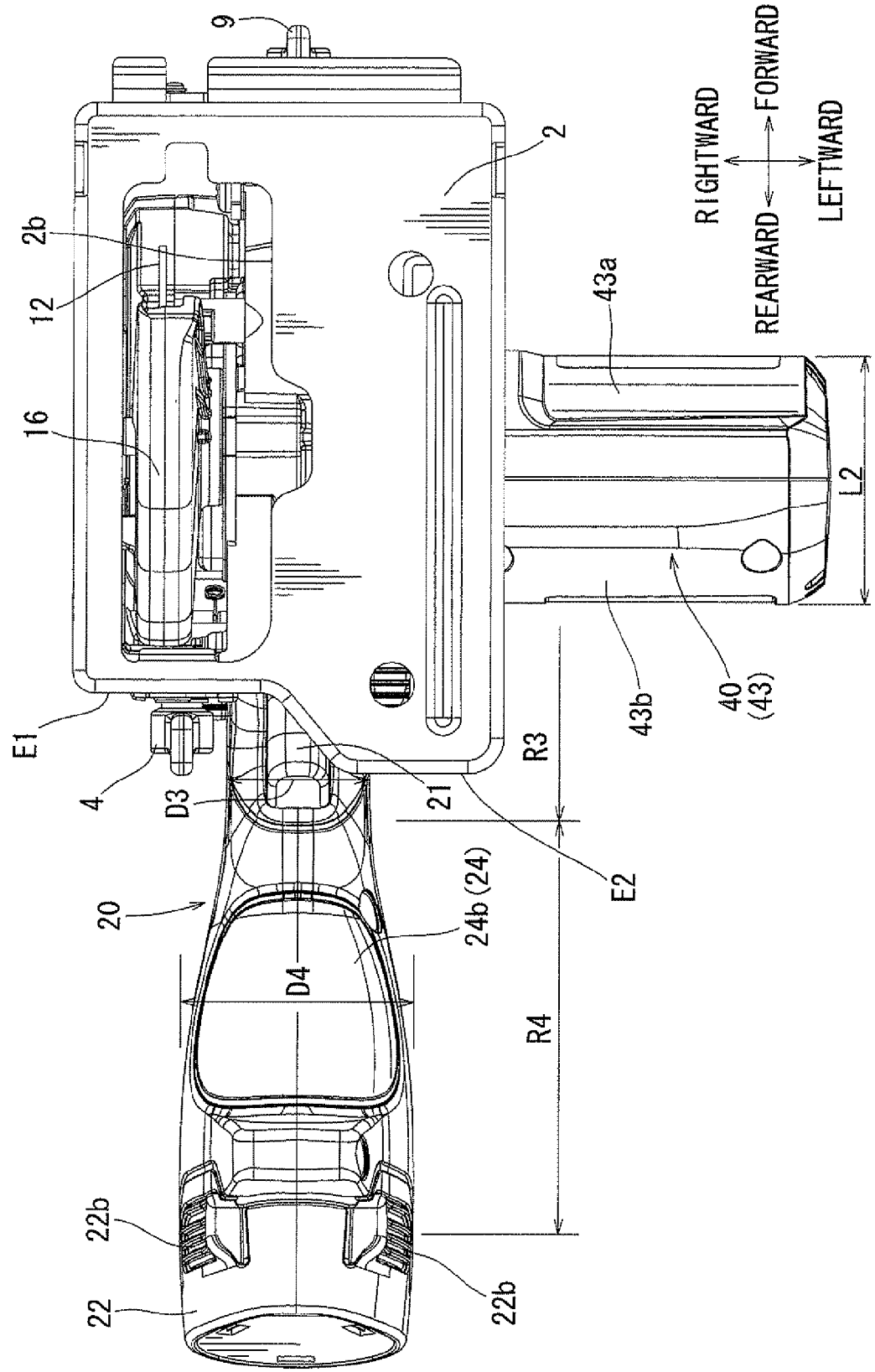
FIG. 11 is a bottom view of the cutting tool.

As shown in FIGS. 9 and 11, a substantially rectangular window 2b elongated in forward and rearward directions is formed in the base 2 and extends throughout the thickness thereof, so that the lower portion of the rotary cutting blade 12 protrudes downward from the base 2 through the window 2b. The lower portion of the rotary cutting blade 12 protruding downward from the base 2 can cut into the workpiece W during the cutting operation. More specifically, a front part (with respect to the cutting direction) of a portion of the rotary cutting blade 12 intersecting with a plane of the lower surface of the base 2 cuts into the workpiece during the cutting operation, and therefore, cutting dust or powder is produced at a point on the front side of the intersecting portion. This point on the front side of the intersecting portion will be hereinafter called a "cutting point" and is labeled with reference sign "C" in FIG. 1.

Figure 3:
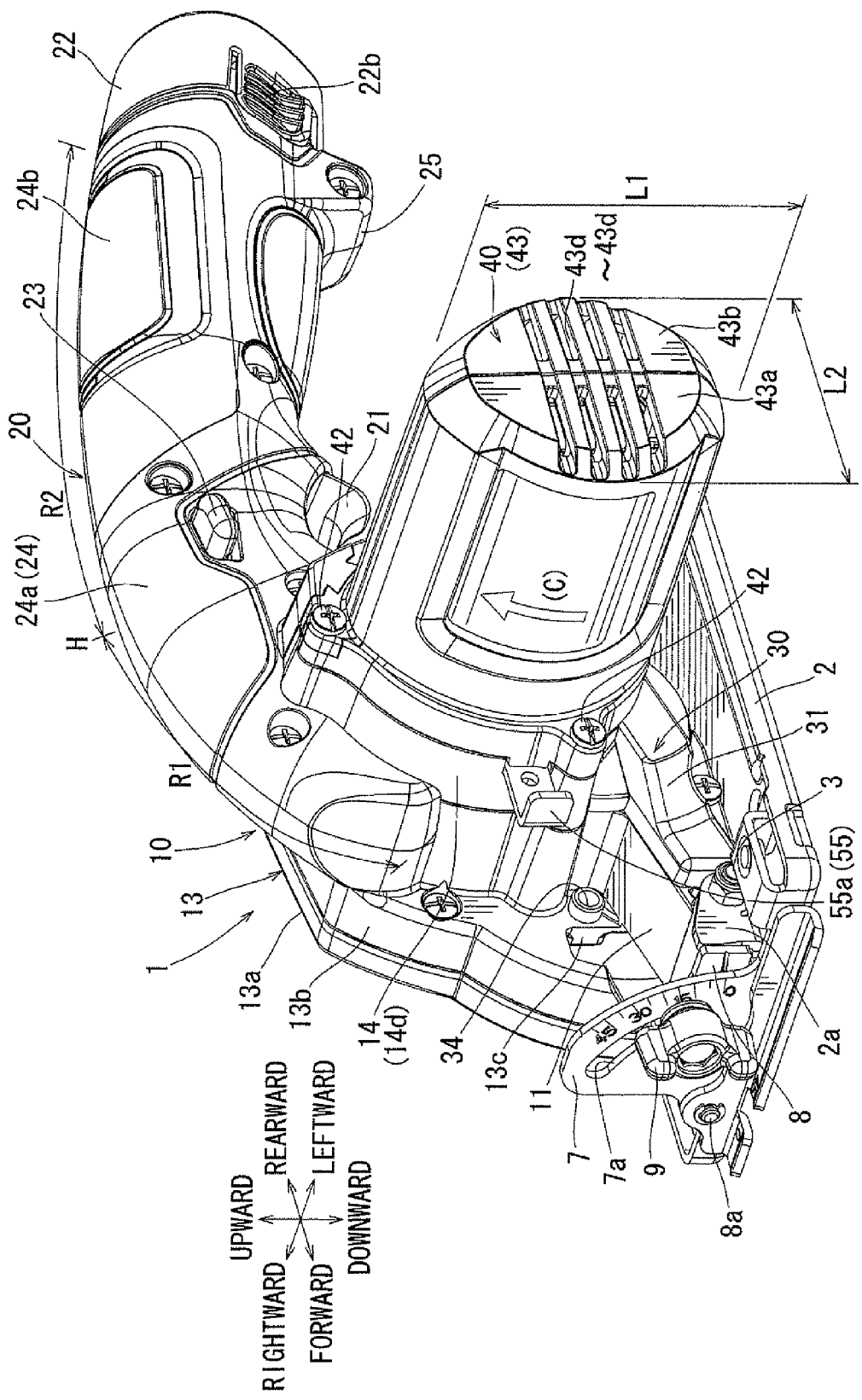
FIG. 3 is a perspective view of the cutting tool as viewed from a left front side.

The rotary cutting blade 12 of the tool unit 10 has a circular shape and is rotatably driven by an electric motor 40. An upper part of the rotary cutting blade 12 is covered by a blade case 13. The blade case 13 includes a case cover 13a and a case body 13b covering an upper right portion and an upper left portion of the rotary cutting blade 12, respectively. The case cover 13a and the case body 13b are joined together to form the blade case 13, so that the case cover 13a and the case body 13b serve as split halves of the blade case 13. As shown in FIG. 3, the electric motor 40 is mounted to the left side portion (back side portion) of the case body 13b via a gear head portion 14 that has a gear head housing 14d, in which a reduction gear mechanism is disposed.

Figure 15:
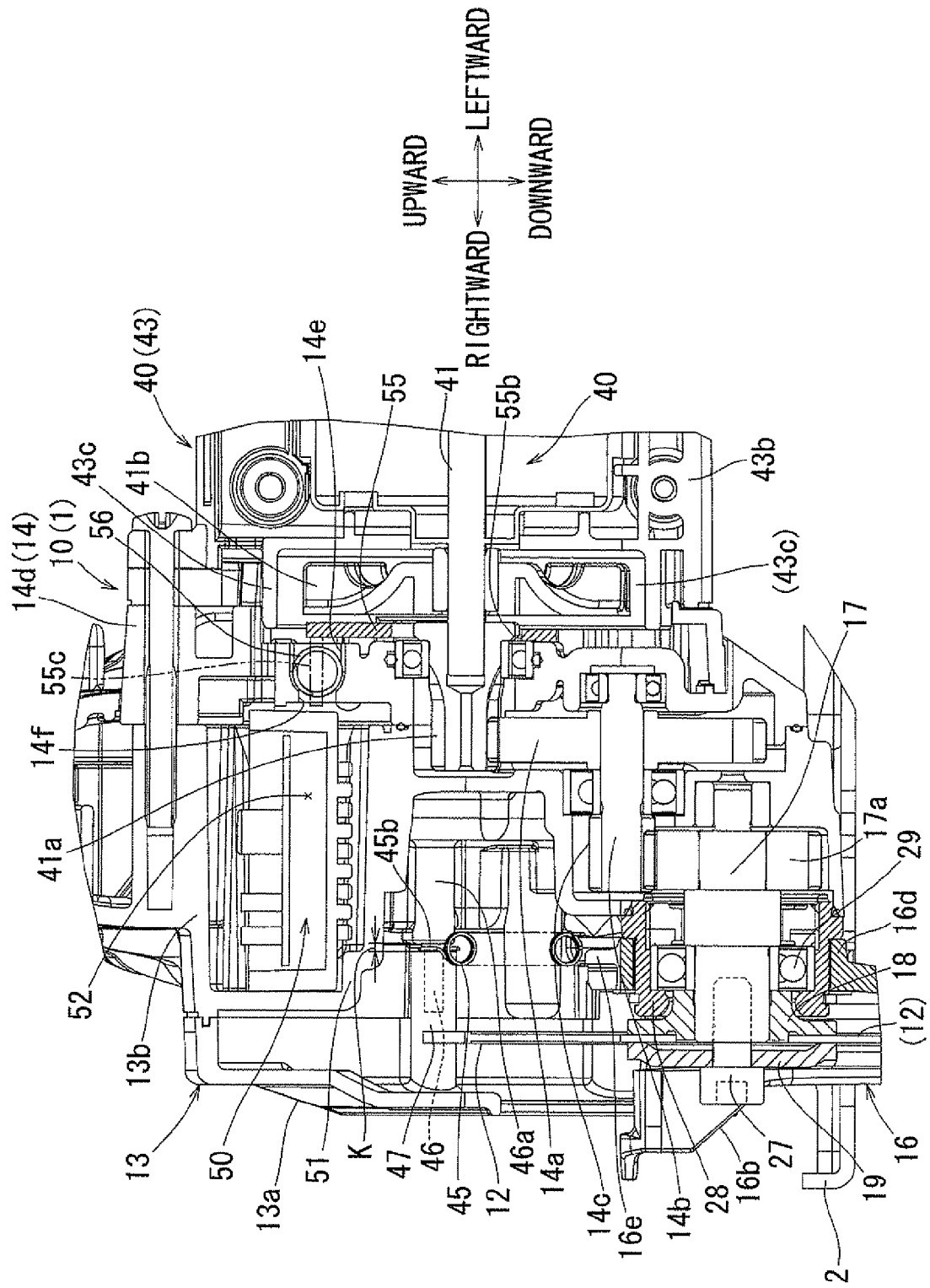
FIG. 15 is a cross sectional view taken along line (XV)-(XV) in FIG. 1 and showing an electric component storage compartment and its surrounding within an upper portion of a blade case.

Referring to FIG. 15, the rotation of the electric motor 40 is transmitted to a spindle 17 via the gear head portion 14 (more specifically, the reduction gear mechanism). The spindle 17 is rotatably supported within a boss portion 28 of the case body 13b of the blade case 13 via a bearing 29. The rotary cutting blade 12 is mounted to an end portion of the spindle 17 so as to have the same axis as the spindle 17. The rotary cutting blade 12 is fixed in position at the end portion of the spindle 17 by being clamped between a support flange 18 and a stationary flange 19. The clamping state of the rotary cutting blade 12 by the support flange 18 and the stationary flange 19 is maintained by tightening a fixing screw 27 into a corresponding threaded hole formed in the end portion of the spindle 17. The rotary cutting blade 12 can be removed from the spindle 17 by loosening the fixing screw 27 and removing the same from the spindle 17.

Figure 17:
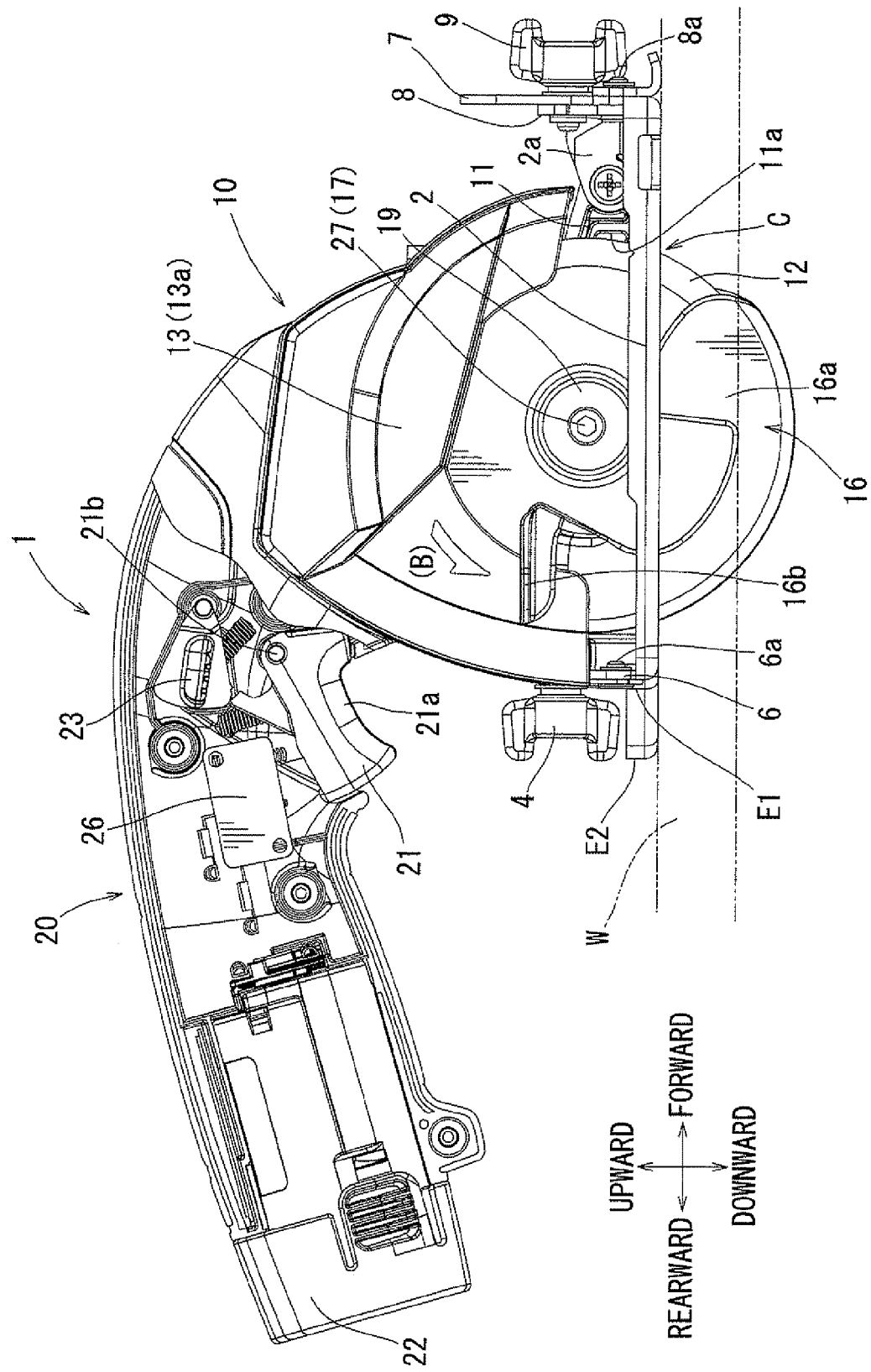
FIG. 17 is a left side view of the cutting tool and showing the handle in a sectional view along a longitudinal direction.

A handle 20 is disposed at an upper portion of the case body 13b of the blade case 13 and extends rearwardly therefrom. The handle 20 has a split-half structure and includes left and right handle halves. A trigger or a switch lever 21 is disposed on the lower side of the front lower portion of the handle 20 and can be operated for starting the electric motor 40. As shown in FIG. 17, the switch lever 21 is vertically pivotally supported by the handle 20 via a support shaft 21b. A switch body 26 is disposed within the handle 20 on the upper side of the switch lever 21. The electric motor 40 is electrically connected to the switch body 26, so that the electric motor 40 starts when the switch body 26 is turned on.

In order to start the electric motor 40, the operator grasps the handle 20 with his or her one hand, puts a fingertip of a finger, such as an index finger F2, of the one hand (grasping the handle 20) on a finger contact portion 21a of the switch lever 21, and pulls the finger contact portion 21a upward, so that the switch body 26 is operated to be turned on. Then, the electric motor 40 starts to rotate. As the electric motor 40 rotates, the rotary cutting blade 12 rotates in a direction indicated by an outline arrow (B) in the drawings. When the operator releases his or her finger from the finger contact portion 21 to stop the pulling operation of the switch lever 21, the switch body 26 turns off to stop the electric motor 40. Therefore, the rotation of the rotary cutting blade 12 is stopped.

A lock-off lever 23 is disposed on the upper side of the switch lever 21. The lock-off lever 23 normally prevents the switch lever 21 from being pulled upward. The switch lever 21 can be pulled upward only when the lock-off lever 23 is pushed downward.

When a battery pack 22 is mounted to the rear end of the handle 20 as shown in FIG. 17, an electric power is supplied from the battery pack 22 to the electric motor 40 via a power source circuit (not shown). The battery pack 22 can be removed from the handle 20 for recharging batteries (battery cells) of the battery pack 22 by a battery charger (not shown), so that the battery pack 22 can be repeatedly used.

The cutting operation proceeds as the rotary cutting blade 12 (rotated by the electric motor 40) cuts into the workpiece 12. The rotary cutting blade 12 rotates in the direction indicated by the outline arrow (B) in FIG. 1 (a counterclockwise direction as viewed in FIG. 1). Therefore, during the cutting operation, the cutting chips (or cutting powder) of the workpiece W are forced to be thrown upward from the cutting point C of the rotary cutting blade 12. A part of the cutting chips or powder thrown upward may flow rearwardly within the blade case 13, and the remaining part of them may be deposited on the workpiece W at positions that are adjacent to the cutting point C during the cutting operation. To this end, the cutting tool 1 of this example is provided with a blower 30 that can blow off the cutting chips or powder deposited on the workpiece W. The blower 30 is configured to utilize a flow of cooling air that cools the electric motor 40 as will be explained later. The flow of the cooling air is also used for cooling an electric component other than the electric motor 40 as will be explained later.

Figure 18:
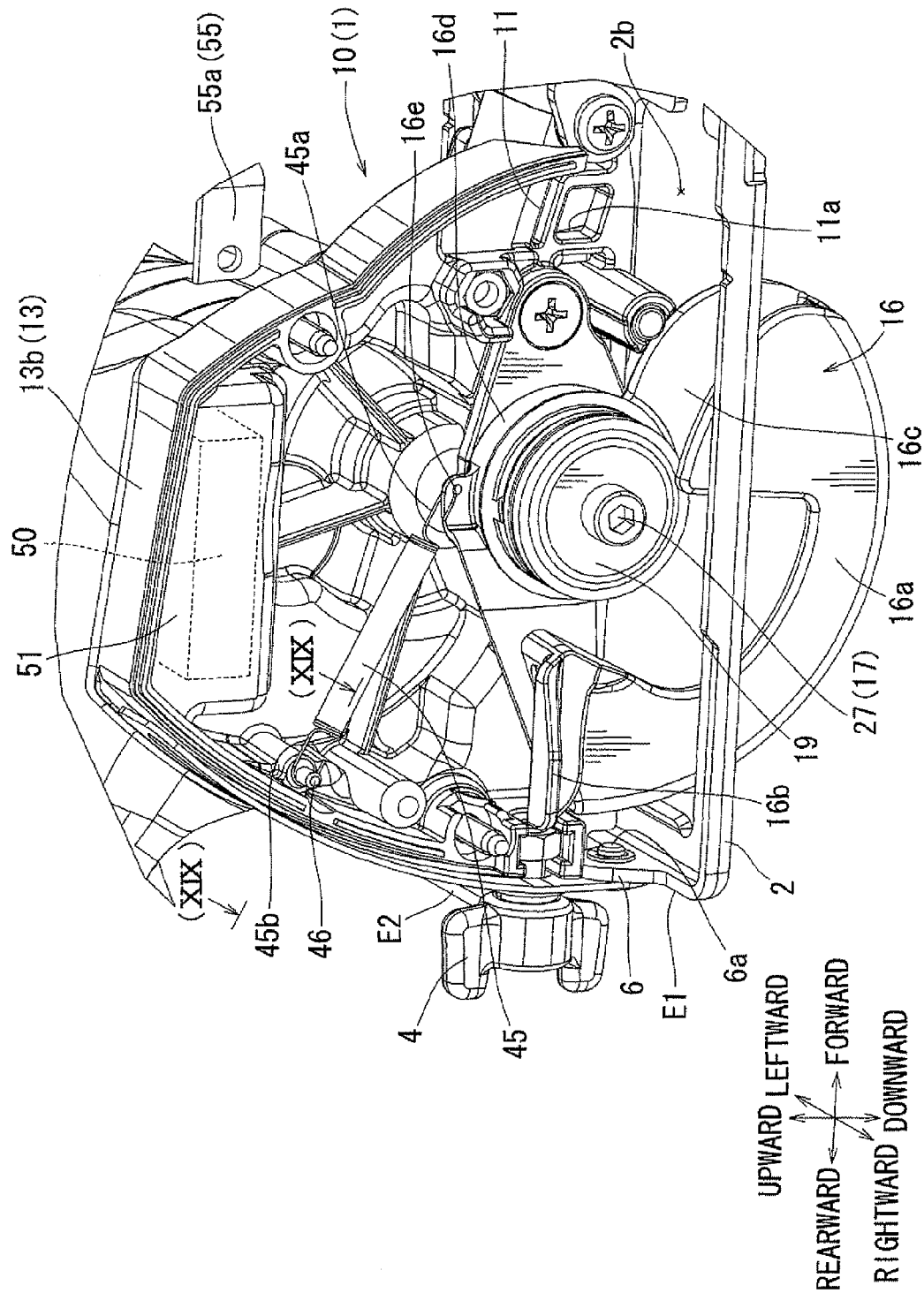
FIG. 18 is a perspective view showing the internal construction of the blade case with the rotary cutting blade removed.

As described previously, the upper part of the rotary cutting blade 12 is covered by the blade case 13. A movable cover 16 covers the lower part of the rotary cutting blade 12 and is supported by the tool unit 10 so as to be rotatable about the same axis as the spindle 17, to which the rotary cutting blade 12 is mounted. As the cutting tool 1 moves in the cutting direction during the cutting operation, the front portion of the movable cover 16 abuts to the workpiece W and is pushed rearwardly, so that the movable cover 16 is opened. As shown in FIG. 18, a tension coil spring 45 biases the movable cover 16 toward a close position for covering the lower part of the rotary cutting blade 12 as will be described later.

The configuration of the handle 20 will now be described. The handle 20 has a bar-like shape having a base end on the side of the tool unit 10 (more specifically, the side of the gear head portion 14) and extends from the tool unit 10 in parallel to the surface of the rotary cutting blade 12. Thus, the handle 20 does not have a loop shape but has a free end on its rear side. As will be seen from FIG. 1, the handle 20 has an arcuate configuration gently curved such that it is convexed upward like an upwardly oriented angle as a whole as viewed in a left or right side view. Therefore, when the tool unit 10 is positioned at its lowermost position to provide a maximum cutting depth by the rotary cutting blade 12, the handle 20 has a part positioned at the highest as viewed in the side view. This highest part will be hereinafter called a "top part H." In this example, a distance between the top part H and the base end of the handle 20 is shorter than a distance between the top part H and the free rear end. The handle 20 has a maximum curvature factor (i.e., a minimum radius of curvature) at the top part H, so that the handle 20 has a steepest curvature at the top part H. In this example, the radius of curvature at the top part H is set to be 100 mm. The curvature factor at a down-turning front region R1 (see FIG. 2) on the front side of the top part H (on the side of the base end) of the handle 20 is smaller than that at the top part H. In other words, the radius of curvature at the front region R1 is larger than that at the top part H. Therefore, the upper surface (upper edge) at the front region R1 of the handle 20 is gently curved. A down-turning rear region R2 on the rear side of the top part H has a smaller curvature factor (i.e., a larger radius of curvature) than at the front region R1, so that the upper surface (upper edge) at the rear region R2 is more gently curved. Therefore, the rear region R2 can comfortably fit with a palm of the hand of the operator when grasped. In this example, the radius of curvature at the rear region R2 is set to be 400 mm. In this way, the rear region R2 on the rear side of the top part H is most gently curved so as to be inclined downward. The switch lever 21 is positioned on the lower side of a part of the handle 20 proximal to the top part H. Because the top part H is positioned between the front region R1 and the rear region R2, the top part H may be called an "intermediate part" between the front and rear regions R1 and R2. Further, in this example, the front region R1, the top part H (intermediate part) and the rear region R2 are curved toward the same direction that is the direction of rotation of the rotary cutting blade 12 (see the outline arrow (B)).

As described above, the handle 20 has a bar-like shape (not a loop-shape) having the free rear end, and therefore, the operator can easily grasp the handle 20 by extending his or her fingertips to the lower side of the handle 20 in comparison with the case that the operator grasps a loop-shaped handle. In addition, the palm of the hand of the operator can be put on the rear region R2 that is positioned on the rear side of the top part H of the handle 20 and gently inclined downward. Therefore, the operator who takes a comfortable posture can easily and efficiently apply a forwardly pushing force to the cutting tool 1 in comparison with a case that the rear region extends horizontally. As a result, the handle 20 can ensure an improved operability of the cutting unit 1.

In addition, in this example, with respect to the position in the forward and rearward directions, the top part H of the handle 20 is set to be positioned on the rear side of the rotational axis (or the spindle 17) of the rotary cutting blade 12 and also on the rear side of the rotational axis of the electric motor 40 (see an output shaft 41 of the motor 40 in FIG. 15), so that a gravity center of the tool unit 10 is positioned on the front side of the top part H. Therefore, the operator can easily push the cutting tool 1 forwardly by one hand that grasps the handle 20.

Further, with respect to the position in the vertical direction, the rear end side of the handle 20 extends to a position at a lower level than a level 12h shown in FIG. 1 and indicative of a level of the upper end of the rotary cutting blade 12.

Figure 10:
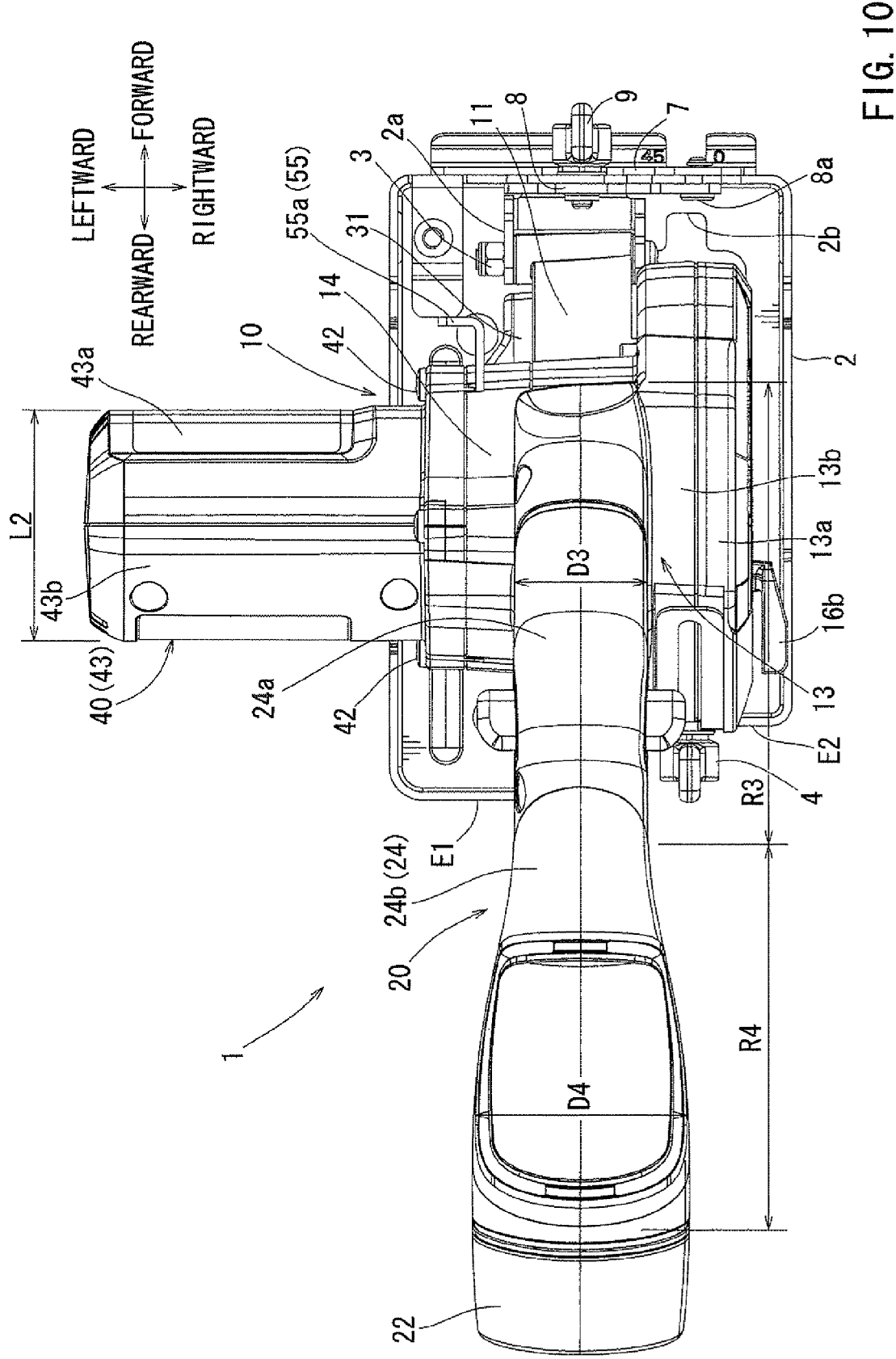
FIG. 10 is a plan view of the cutting tool.

Referring to FIGS. 10 and 11, the handle 20 is configured to have a width that becomes thinner in the forward direction (or becomes thicker in the rearward direction). In this example, a front region R3 on the front side with respect to a reference position proximal to a rear portion of the switch lever 21 has a width D3. On the other hand, a rear region R4 on the rear side with respect to the reference position has a width D4 that is larger than the width D3. For example, when the operator grasps the handle 20 with his right hand RH (see FIG. 20), mainly a thumb F1 and the index finger F2 of the right hand RH may be put on the front region R3, while mainly a middle finger F3, a medicinal finger F4, a little finger F5 and a palm FP may be put on the rear region R4. Therefore, the operation for pulling the switch lever 21 by the index finger F2 can be easily performed while firmly grasping the handle 20 by holding the thick rear region R4 between the middle finger F3, the medicinal finger F4, the little finger F5 and the palm FP.

Because the handle 20 has an upwardly curved configuration as viewed from the side view and has a width that becomes thicker in the rearward direction, it is possible to improve the operability of the cutting tool 1 and to provide an excellent grip feeling to the operator when grasped.

Figure 6:
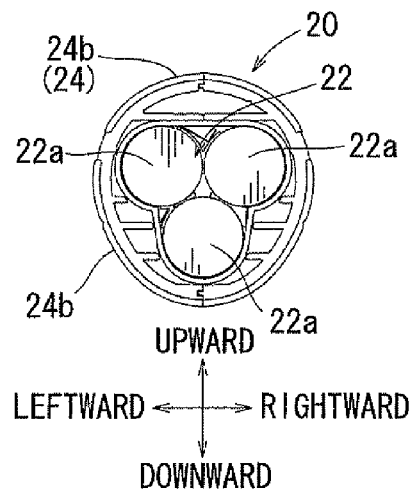
FIG. 6 is a sectional view of a handle taken along line (VI)-(VI) in FIG. 1.
Figure 7:
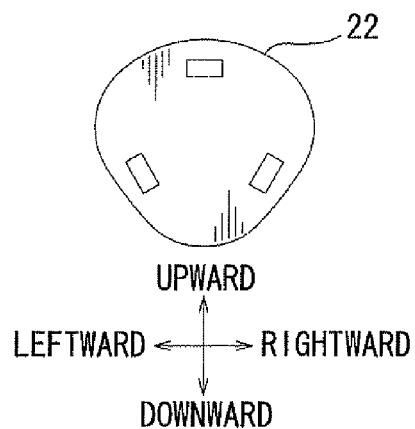
FIG. 7 is a view of a battery pack mounted to the handle as viewed in a direction indicated by arrows (VII) in FIG. 1.

The battery pack 22 mounted to the rear end of the handle 20 has three battery cells 22a disposed therein as shown in FIG. 6. In this example, the battery pack 22 has a rating voltage of between 10.8V and 12V and has a relatively small size. Two of the battery cells 22a are arranged in parallel to each other on the upper side within the battery pack 22, while the remaining one of the batter cells 22a is positioned on the lower side of the two upper battery cells 22a. Thus, the battery cells 22a are arranged in an inverted triangle. To accommodate the inverted triangular arrangement of the battery cells 22a, the outer contour of the battery pack 22 is configured to have a shape of a substantially inverted triangle with its apex oriented vertically downward. Further, to accommodate the substantially inverted triangle of the battery pack 22, the sectional configuration of the rear end portion of the handle 20, to which the battery pack 22 is mounted, also is configured to have a shape of a substantially inverted triangle, with the apex of the triangle oriented downward and the bottom side of the triangle positioned on the upper side.

Because the sectional configuration of the rear end portion of the handle 20 has a substantially inverted triangular shape, that has a minimum number of corners than the other polygonal shapes, each of corners in the outer contour of the rear end portion has a small angle. Therefore, potential slippage of fingers on the outer surface of the rear end portion can be prevented or reduced. In particular, it is possible to prevent or minimize slippage of the little finger F5, through which it is difficult to apply a strong force to the handle 20. As a result, it is possible to further improve the operability of the cutting tool 1. Further, when the operator grasps the handle 20, mainly the medicinal finger F4 and the little finger F5 are put on the lower outer surface of the rear end portion of the handle 20. Because the lower outer surface of the rear end portion has a shape that is steeply curved due to a small radius of curvature corresponding to the apex of the inverted triangle, the medicinal finger F4 and the little finger F5 can be put on the steeply curved lower outer surface of the rear end portion in such a manner that they extend along the lower outer surface. Therefore, although it is difficult to apply strong forces to the handle 20 by the medicinal finger F4 and the little finger F5, it is possible to reliably engage these fingers with the handle 20. As a result, it is possible to provide a more excellent grip feeling to the operator and to further effectively apply the operational force to the cutting tool 1.

Further, the inverted triangular shape of the sectional configuration of the rear end portion of the handle 20 enables the operator to reliably grasp the handle 20 without causing slippage in the circumferential direction of the handle 20. Therefore, the operator can takes a stable posture for moving the cutting tool 1.

The outer contour of the rear end portion of the handle 20 and the outer contour of the battery pack 22 are configured such that the outer surfaces, in particular the upper side surfaces, of the rear end portion of the handle 20 and the battery pack 22 smoothly continue with each other when the battery pack 22 is mounted to the rear end portion of the handle 20. In other words, the outer surfaces, in particular the upper side surfaces, of the rear end portion of the handle 20 and the battery pack 22 extend substantially within the same plane. Because the battery pack 22 is mounted to the rear portion of the handle 20 not to extend laterally by a large distance, the battery pack 22 and the handle 20 are integrated as a single unit from a viewpoint of its appearance, and therefore, the appearance of the cutting tool 1 can be improved. In addition, the battery pack 22 does not interfere with the operation of the cutting tool 1.

In this example, the battery pack 22 is mounted to the rear end portion of the handle 20 by inserting the batter pack 22 into a storage space defined within the rear end portion. The battery pack 22 has engaging claws on its left and right sides. When the battery pack 22 is inserted into the rear end portion, the engaging claws engage the corresponding engaging portions formed on the inner wall of the storage space, so that the battery pack 22 can be held in position. Release buttons 22b are provided on the battery pack 22. When the operator pushes the release buttons 22b, the engaging claws retract to disengage from the corresponding engaging portions of the storage space, so that the battery pack 22 can be removed from the storage space. After removing from the storage space, the battery pack 22 can be recharged by the battery charger, so that the battery pack 22 can be repeatedly used.

Figure 20:
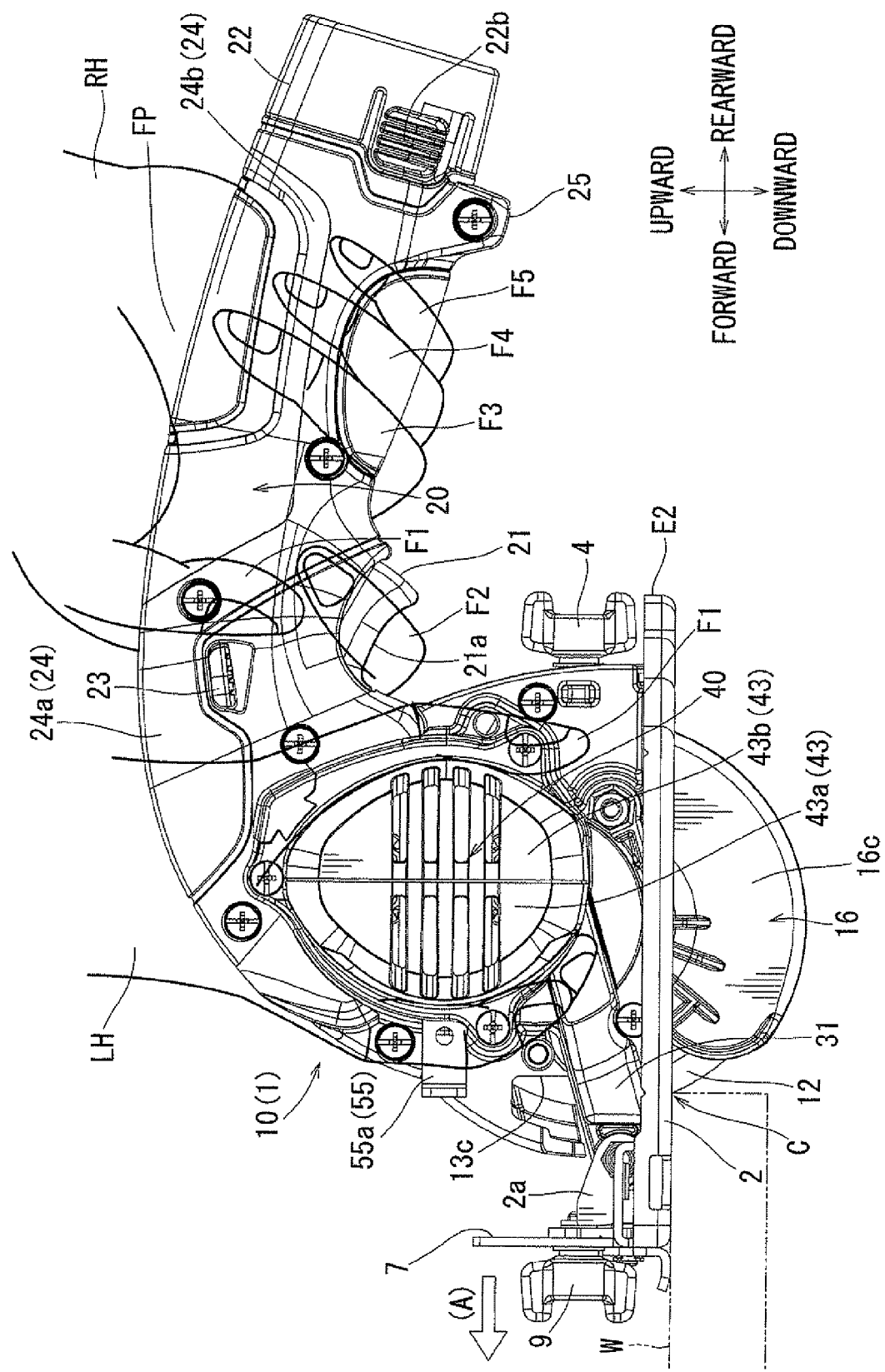
FIG. 20 is a left side view of the cutting tool and showing the state where the handle is grasped by a right hand of an operator and the motor housing is grasped by a left hand of the operator and serves as a sub-grip.

The outer surface of the handle 20 is covered with an elastomeric resin layer 24 that can prevent slippage of the operator's hand or fingers when the operator grasps the handle 20. Preferably, the elastomeric resin layer 24 is molded integrally with the upper surface of the handle 20 during the manufacturing process of the handle 20, for example, by using a two-color (two-material) molding process that is well known in the art. The elastomeric resin layer 24 includes an upper surface covering portion 24a and an entire circumference covering portion 24b. The upper surface covering portion 24a covers only the upper side surface of the handle 20 within the front region R1 on the front side of the top part H, in particular the front side of the lock-off lever 23. The entire circumference covering portion 24b covers substantially the entire circumference of the handle 20 within the rear region R2 on the rear side of the top part H. When the operator grasps the handle 20 as shown in FIG. 20, mainly the thumb F1 of his or her hand RH is put on the upper surface covering portion 24a. On the other hand, mainly the middle finger F3, the medicinal finger F4, the little finger F5 and the palm FP are put on the entire circumference covering portion 24b.

In this way, the elastomeric resin layer 24 covers the handle 20 over the region on which the palm FP and the fingers including the thumb F1, the middle finger F3, the medicinal finger F4, the little finger F5 may be put, so that an improved slip prevention function and an improved grip feeling can be given to the handle 20. Therefore, in conjunction with the upwardly curved configuration of the handle 20 described previously, it is possible to provide an excellent operability and an excellent grip feeling to the handle 20.

Figure 4:
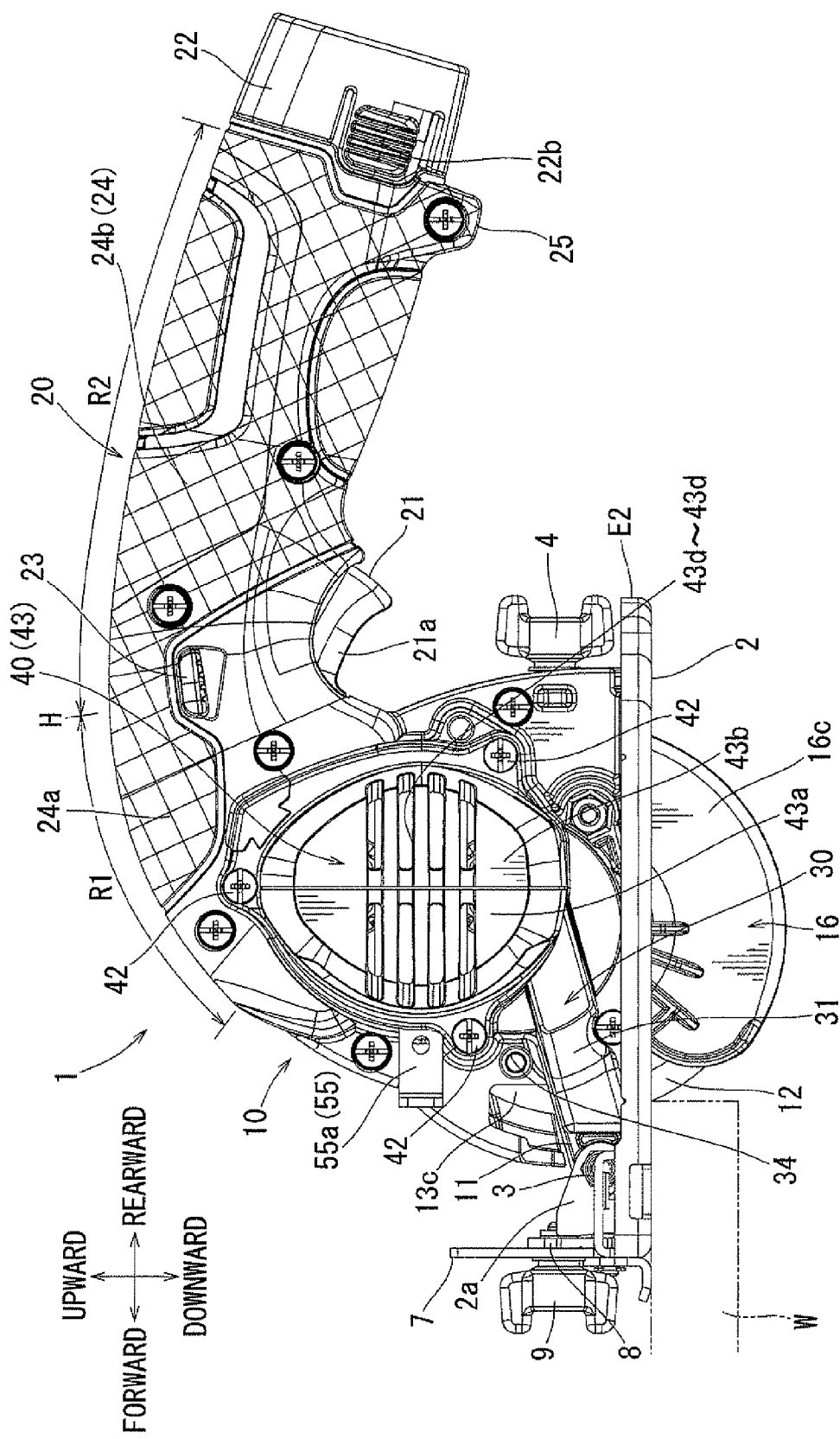
FIG. 4 is a left side view of the cutting tool.
Figure 5:
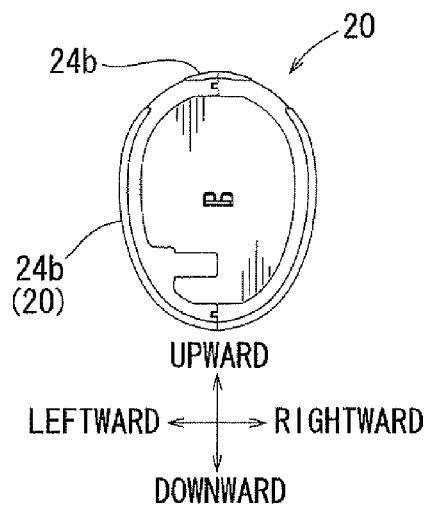
FIG. 5 is a sectional view of a handle of the cutting tool taken along line (V)-(V) in FIG. 1.

For the purpose of illustration, the region covered by the elastomeric resin layer 24 (including the upper surface covering portion 24a and the entire circumference covering portion 24b) is indicated with a hatched pattern in FIGS. 1 and 4.

A leg 25 is formed integrally with the lower surface of the rear end portion of the handle 20 and protrudes downwardly therefrom. Therefore, when the cutting tool 1 is placed on a surface, such as a surface of a workbench, the leg 25 can contact the surface for preventing the cutting tool 1 from tilting over sideways, so that the cutting tool 1 can be reliably held in an upright position. Also, the surface of the leg 25 is covered with an elastomeric resin layer, so that it is possible to prevent a potential damage to the surface with which the leg 25 may contact or the surface of the workpiece W. The protruding length of the leg 25 is determined such that the leg 25 can contact the surface, on which the cutting tool 1 is placed, regardless of the presence of the battery pack 22 mounted to the handle 20. In this example, the leg 25 serves also as a joint portion for joining the handle halves of the handle 20 by using a screw.

As shown in FIGS. 3 and 4, the electric motor 40 is fixedly mounted to the gear head portion 14 by using three fixing screws 42 and protrudes leftwardly from the gear head portion 14. As shown in FIG. 15, the output shaft 41 of the electric motor 40 extends in the right and left direction in parallel to the spindle 17. The reduction gear mechanism has a plurality of reduction stages (two reduction stages are provided in this example) and is disposed within the gear head portion 14 so as to be positioned between the output shaft 41 and the spindle 17. The reduction gear mechanism includes a pinion gear 41a mounted to the output shaft 41 of the electric motor 40, an intermediate drive gear 14a meshing with the pinion gear 41a and fixedly mounted to an intermediate shaft 14b that is rotatably supported within the gear head portion 14, an intermediate driven gear 14c fixedly mounted to the intermediate shaft 14b and rotating together with the intermediate drive gear 14a, and an output gear 17a fixedly mounted to the spindle 17 and meshing with the intermediate driven gear 14c. Therefore, the rotation of the output shaft 41 is transmitted to the spindle 17 after being reduced at two stages through meshing between the pinion gear 41a and the intermediate drive gear 14a and through meshing between the intermediate driven gear 14c and the output gear 17. The intermediate shaft 14b is positioned upwardly of the spindle 17, and the output shaft 41 is positioned upwardly rearwardly of the intermediate shaft 14b. With this arrangement, it is possible to ensure a large distance between the output shaft 41 and the spindle 17, so that the electric motor 40 can be spaced upwardly from the spindle 17 by a suitable distance.

As described above, the rotation of the electric motor 41 is transmitted to the spindle 17 via the two reduction stages of the reduction gear mechanism, and the electric motor 40 is positioned to be offset upwardly from the spindle 17. Therefore, it is possible to ensure a suitable clearance between the base 2 and the electric motor 40 even in the case that the rotary cutting blade 12 is positioned for providing a maximum cutting depth. For this reason, when the operator grasps the electric motor 40 with his or her left hand LH for using the electric motor 40 as a sub-grip as will be explained later, fingertips of the left hand LH may not contact the base 2, so that the electric motor 40 can be effectively used as the sub-grip.

The electric motor 40 is split into a front housing half 43a and a rear housing half 43b along a plane including the axis of the output shaft 41. Thus, the front and rear housing halves 43a and 43b are joined together to form a motor housing 43 having a tubular configuration.

As shown in FIG. 3, the motor housing 43 has a configuration like a cylindrical tube flattened in the forward and rearward direction (horizontal direction). More specifically, as viewed in a cross section perpendicular to the longitudinal axis of the motor housing 43, the motor housing 43 has a maximum vertical diameter (vertical length) L1 and a maximum horizontal diameter (horizontal length) L2 that is shorter than the maximum vertical diameter (vertical length) L1. In this example, the longitudinal axis of the motor housing 43 coincides with the axis of the output shaft 41. In addition, with respect to a height from the base 2, the maximum horizontal diameter L2 extends at a level slightly lower than a level of a central point of the maximum vertical diameter (vertical length) L1.

Due to the horizontally flattened cylindrical configuration of the motor housing 43, the operator can easily grasp the motor housing 43. Because the electric motor 40 protrudes leftward as viewed from the side of the operator, the operator can grasp the handle 20 with his or her right hand RH and can also grasp the electric motor 40 (i.e., its motor housing 43) with his or her left hand LH by using the electric motor 40 as the sub-grip. Thus, the operator can grasp the cutting tool 1 with his or her both hands RH and LH, so that he or she can stably perform the operation for moving the cutting tool 1.

Because the axis of the output shaft 41 coincides with the longitudinal axis of the motor housing 43, the output shaft 41 is positioned at the same level as the maximum horizontal diameter (maximum horizontal length) L2. In addition, the output shaft 41 extends at a level slightly lower than a central point in the vertical direction of the motor housing 43 (i.e. the central point of the maximum vertical diameter L1).

The upper portion of the outer surface of the motor housing 43 is configured to have a shape like an angle having an upwardly oriented rounded corner that has a radius of curvature smaller than a radius of curvature of the lower portion of the motor housing 43. In other words, the upper portion of the outer surface of the motor housing 43 is curved with a larger curvature factor than that of the lower portion. Therefore, the upper portion of the outer surface of the motor housing 43 has an upwardly pointed rounded corner. When the operator grasps the motor housing 43 with his or her left hand LH for using the motor housing 43 as the sub-grip, the upwardly pointed rounded corner may enter between the thumb F1 and the index finger F2 of the left hand LH, so that an improved grip feeling can be given to the operator.

Further, the motor housing 43 has a constant thickness throughout its length (in the axial direction of the output shaft 41 or the left and right direction of the cutting tool 1). In other words, the outer contour of the cross section of the motor housing 43 may not change in the longitudinal direction. The front housing half 43a and the rear housing half 43b are molded separately by resin. Therefore, it is not necessary to set a draft angle to the motor housing 43 as required for molding a motor housing into a complete cylindrical configuration using a molding die. Setting the draft angle means to set a diameter of a motor housing to become smaller in an axial direction for facilitating removal of the motor housing from a molding die after a molding process. Hence, the motor housing 43 of this example has a constant thickness throughout its length, so that an excellent grip feeling can be given to the operator also in this respect.

As shown in FIG. 4, the electric motor 40 is positioned on the front side of the switch lever 21 of the handle 20. Therefore, when the operator grasps the handle 20 with the right hand RH and grasps the electric motor 40 with the left hand LH, the right hand RH and the left hand LH may not interfere with each other. As a result, an excellent grip feeling of the handle 20 and the electric motor 40 or the sub-grip can be given to the operator also in this respect.

Figure 13:
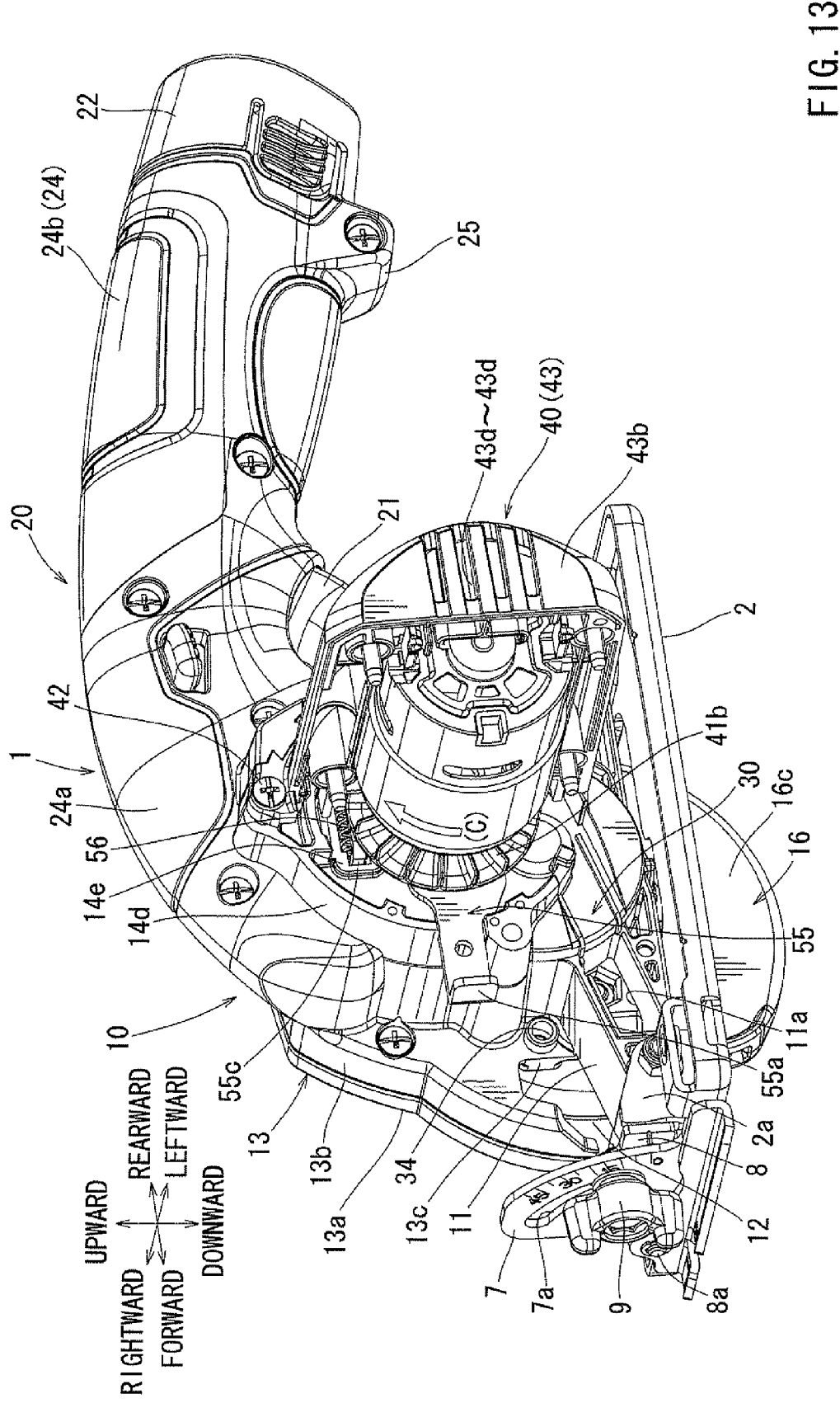
FIG. 13 is a perspective view as viewed from a left front side of the cutting tool with a front side housing half of a motor housing and a blower duct removed.
Figure 14:
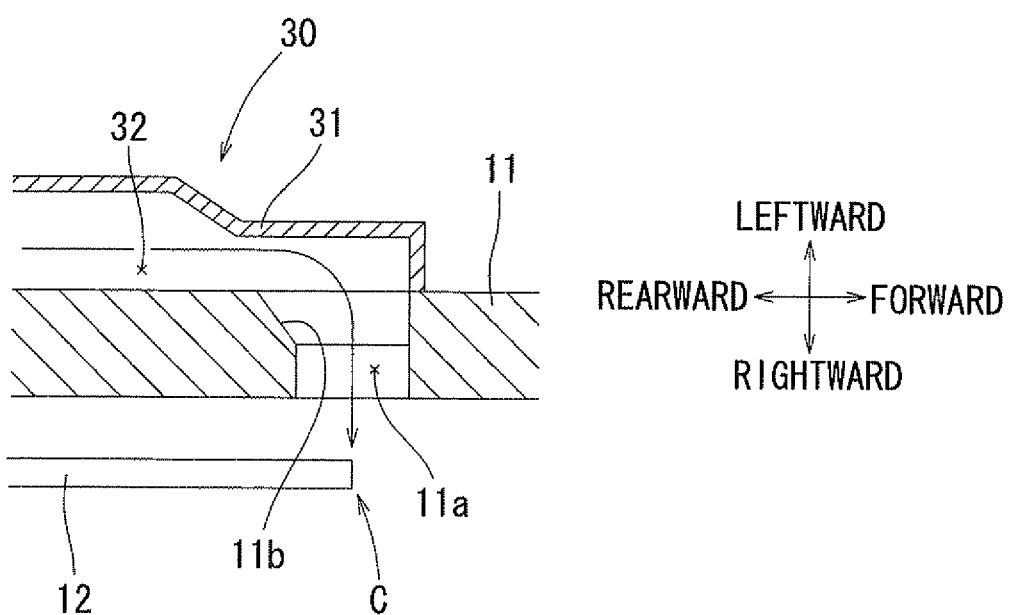
FIG. 14 is a partial sectional view showing the blower duct and an air blow opening.

As described previously, the cutting tool 1 of this example is provided with the blower 30 for blowing off the cutting chips or powder deposited on the workpiece W at positions proximal to the cutting point C. As shown in FIGS. 3 and 4, the blower 30 includes a blower duct 31 mounted to tool unit 10 to extend from the lower portion of the gear head portion 14 along the left side surface of the support arm 11. Referring to FIGS. 13 to 15, a cooling fan 41b is mounted to the output shaft 41 for producing a flow of air for cooling the electric motor 40. In this example, a centrifugal fan is used as the cooling fan 41b. When the electric motor 40 is started, the cooling fan 41b rotates, so that an external air is introduced into the motor housing 43 via air intake openings 43d formed in the end surface (left side surface) of the motor housing 43. The air then flows forwardly around the electric motor 40 to cool the electric motor 40. After cooling the electric motor 40, the air further flows toward the front side of the electric motor 40 and then flows into an inlet of the blower duct 31 positioned on the lateral side of the cooling fan 41b.

Figure 2:
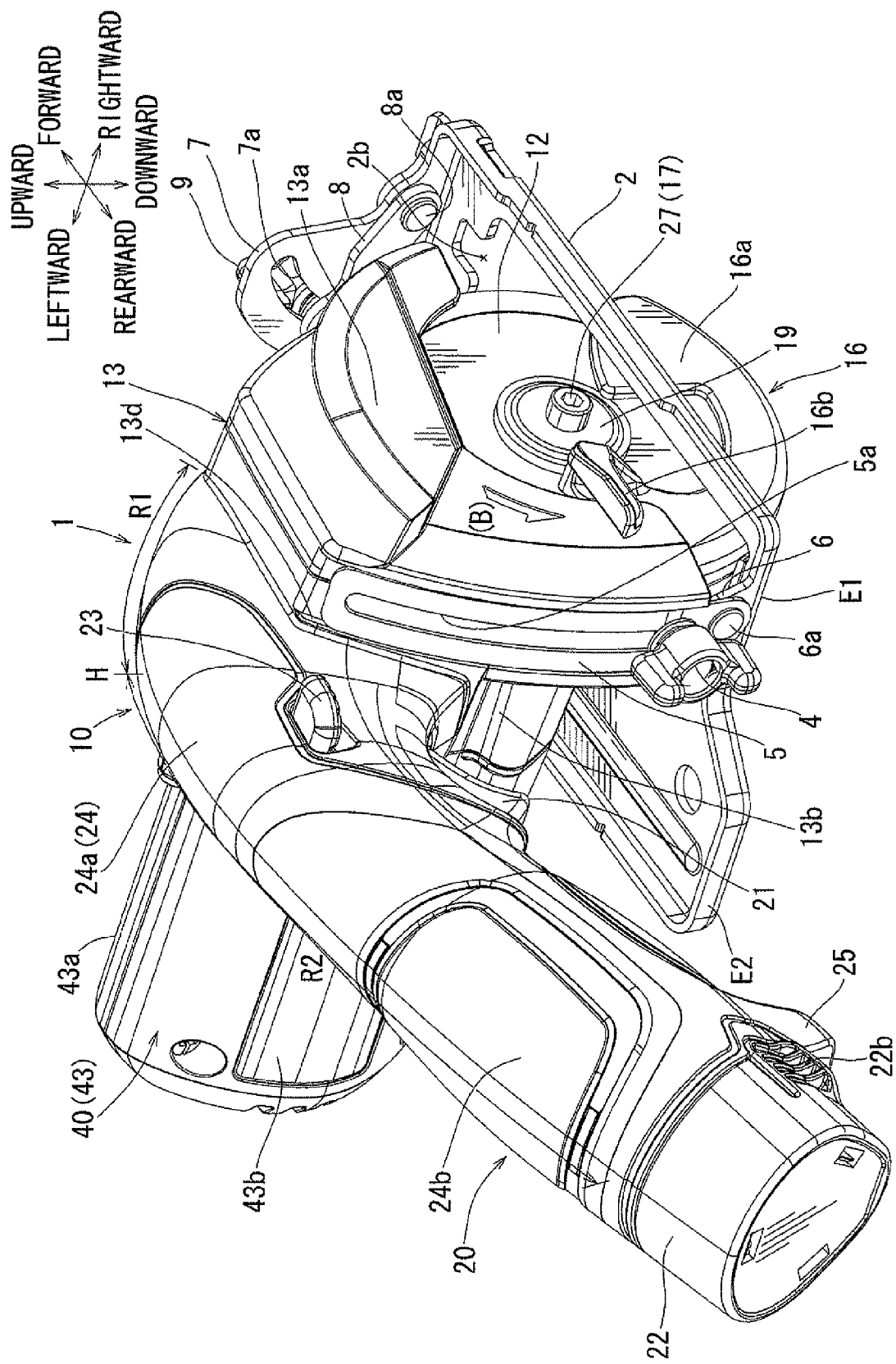
FIG. 2 is a perspective view of the cutting tool as viewed from a right rear side.
Figure 12:
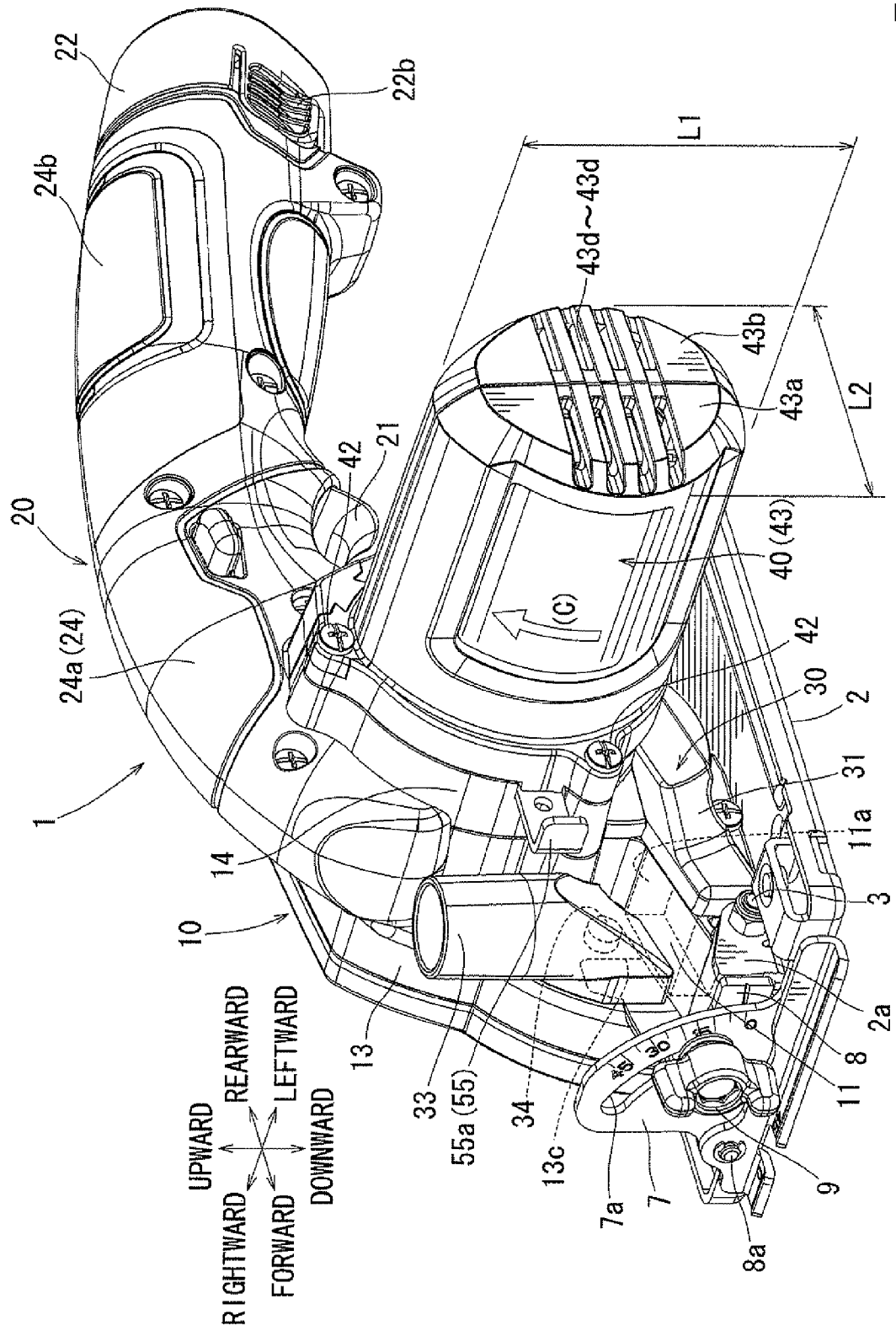
FIG. 12 is a perspective view as viewed from a left front side of the cutting tool similar to FIG. 3 but showing the state where a dust collecting duct is mounted to the cutting tool.

Here, the rotary cutting blade 12 rotates in the direction indicated by the outline arrow (B) in FIGS. 1 and 2. On the other hand, as described previously, the rotation of the electric motor 40 is transmitted to the spindle 17 via the two-stage reduction gear mechanism. Therefore, the rotational direction of the cooling fan 41b is the same as the rotational direction of the rotary cutting blade 12. In FIGS. 3, 12 and 13, the rotational direction of the electric motor 40 is indicated by an outline arrow (C). Because the cutting point C, where the cutting chips or powder is produced, is positioned forwardly of the cooling fan 41b, the blower dust 31 is connected to the lower portion of the gear head portion 14. In the case that the reduction gear mechanism has a single reduction step, the electric motor 40 rotates in the opposite direction, and consequently, the cooling fan 41b also rotates in the opposite direction, so that the cooling air flows forwardly from within the upper portion of the gear head portion 14. In such a case, it is necessary to connect the blower dust 31 to the upper portion of the gear head portion 14.

According to this example, because the rotation of the electric motor 40 is transmitted to the spindle 17 via the two-stage reduction gear mechanism, the rotary cutting blade 12 and the electric motor 40 rotate in the same direction, so that the cooling air flows forwardly from within the lower portion of the gear head portion 14 in a tangential direction of the cooling fan 41b.

The support arm 11 supporting the tool unit 10 on the base 2 extends forwardly from the lower portion of the gear head portion 14. As described above, the blower duct 31 extends along the left side surface of the support arm 11, so that an air introduction passage 32 is defined between the left side surface of the support arm 11 and the blower duct 31 as shown in FIG. 14. An air blow opening 11a is formed in the left side surface of the support arm 11 and serves as the outlet of the blower duct 31 (more specifically, the outlet of the air introduction passage 32). The air blow opening 11a extends throughout the thickness of the support arm 11 in the left and right direction.

The air blow opening 11a has a rectangular configuration and includes a tapered surface 11b as shown in FIG. 14, so that the flow passage area of the air blow opening 11a decreases in the air blowing direction (downward as viewed in FIG. 14). Therefore, as the air enters the air blow opening 11a and flows therethrough, the flow speed of the air increases as a result of decrease of the flow passage area in the air blowing direction. Hence, the air can be efficiently blown toward the cutting point C.

Because the blower 30 utilizes the cooling air of the electric motor 40 for blowing off the cutting chips or powder deposited on the workpiece W at the cutting point C, it is possible to clearly visually recognize the position of the rotary cutting blade 12 relative to a cutting line that may be drawn on the workpiece W. Therefore, the cutting operation can be accurately performed. In addition, because the blower 30 utilizes the motor cooling air, no additional device is necessary for producing flow of the air. For this reason, no substantial increase in the manufacturing cost is necessary for incorporating the blower 30.

In addition, in this example, the air flows in the tangential direction from the lower side of the cooling fan 41b, and therefore, the blower duct 31 extends substantially horizontally from the lower portion of the gear head portion 14 along the upper surface of the base 2. Therefore, the blower duct 31 may not obscure the operator from viewing the cutting point C when the operator intends to visually recognize the cutting point C while he or she takes a comfortable posture. Hence, the operability of the cutting tool 1 is improved also in this respect. In the case that the blower duet is positioned to extend downward from a position on the upper side of the cooling fan 41b, the blower duct may obscure the visual recognition of the cutting point C by the operator. Therefore, the operator may be forced to take a cramped posture. The blower duct 31 can be positioned to extend from the lower portion of the gear head portion 14 along the upper surface of the base 2 for improving the visibility of the cutting point C by setting the number of the reduction stages of the reduction gear mechanism to an even number and by setting the rotational direction of the electric motor 40 and the cooling fan 41b to be the same as the rotational direction of the rotary cutting blade 12 as in this example.

As shown in FIGS. 12 and 13, a window 13c is formed in the front lower end of the blade case 13 at a position on the left side of the cutting point C, so that the operator can more easily and clearly view the cutting point C through the window 13c while he or she takes a comfortable posture. Cutting and removing a part of the front lower end of the blade case 13 can form the window 13e.

A dust collecting nozzle 33 can be mounted to lateral side of the blade case 13 for communicating with the window 13e. FIG. 12 shows the state where the dust collecting nozzle 33 is mounted to the blade case 13, and FIG. 13 shows the sate where the dust collection nozzle 33 has been removed. A dust collecting bag or a dust collecting hose of a dust collector (not shown) can be connected to the dust collecting nozzle 33. With this arrangement, the cutting chips or powder blown off by the flow of air from the blower 30 can be effectively collected, so that it is possible to further improve the visibility of the cutting point C.

In this example, the dust collecting nozzle 33 is mounted to the lateral side of the blade case 13 by using only one fixing screw (not shown) that is threadably engaged with a threaded hole 34 formed in the blade case 13 (see FIGS. 12 and 13). Therefore, the dust collecting nozzle 33 can be removed by simply loosening and removing the fixing screw.

The cooling air for cooling the electric motor 40 is also used for cooling the other electric component disposed within the cutting unit 10. As shown in FIG. 15, an electric component storage compartment 52 is provided within the upper portion of the ease body 13b of the blade case 13. In this example, the electric component stored within the electric component storage compartment 52 is a controller 50. The controller 50 is a molded product and is molded mainly with a control circuit that controls the electric motor 40. The inner space of the electric component storage compartment 52 is separated from the lower space within the case body 13b by a partition wall 51 that is a part of the compartment 52. Therefore, the controller 50 is shielded from the rotary cutting blade 12 and the reduction gear mechanism. Hence, although heat may be produced at the reduction gear mechanism, it may not directly affect the controller 50. In this example, the case body 13b is made of resin and the partition wall 51 is molded integrally with the case body 13b. Because the controller 50 is stored within the electric component storage compartment 52 isolated from the other space by the partition wall 51 that is made of resin, it is possible to electrically isolate the controller 50 from the surrounding. In addition, as shown in FIG. 15, the electric component storage compartment 52 is positioned on the left upper side of the rotary cutting blade 12, so that the electric component storage compartment 52 and eventually the controller 50 stored therein is cooled by the flow of air that may be produce by the rotation of the rotary cutting blade 12.

Figure 16:
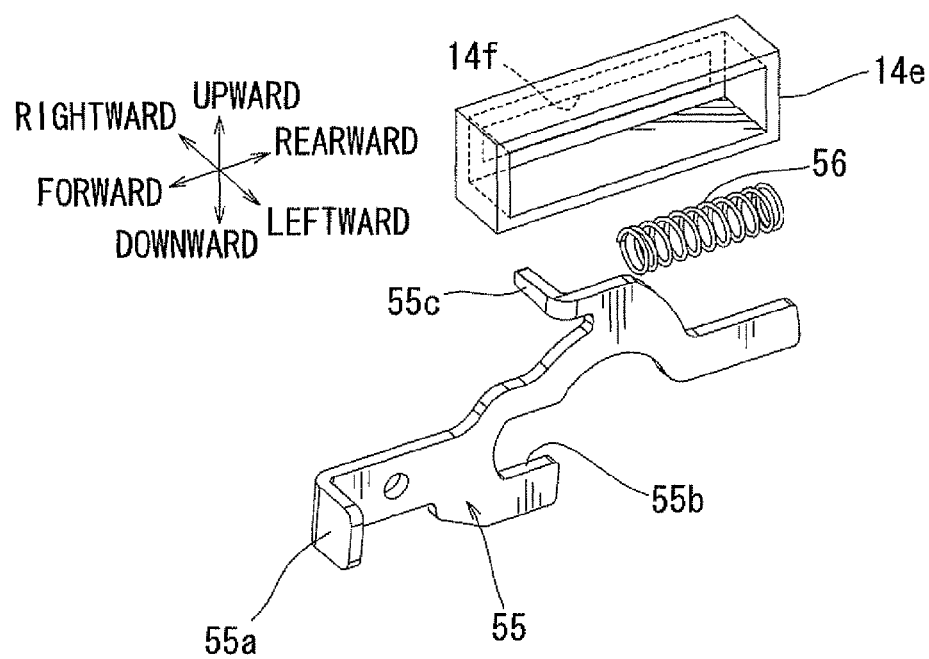
FIG. 16 is an exploded perspective view of a motor lock lever, a compression coil spring and a spring storage compartment of the cutting tool.

A motor lock lever 55 shown in FIG. 16 is positioned between the electric component storage compartment 52 and the cooling fan 41b of the electric motor 40. The motor lock lever 55 is used for non-rotatably locking the output shaft 41 of the electric motor 40. More specifically, when the motor lock lever 55 is moved from an unlock position to a lock position, the output shaft 41 is locked and prevented from rotation. When the output shaft 41 is locked, the spindle 17 is also locked and prevented from rotation. Therefore, the operation for changing the rotary cutting blade 12 to another one can be easily performed. When the motor lock lever 55 returns to the unlock position, the output shaft 41 can freely rotate.

The motor lock lever 55 has an operation portion 55a, a lock recess 55b and a biasing lever portion 55c. As shown in FIGS. 3, 4, 12 and 13, the motor lock lever 55 is held between the motor housing 43 and the gear head housing 14d so as to be movable in the forward and rearward directions or a direction intersecting with the output shaft 41 of the electric motor 40. The operation portion 55a protrudes forwardly outwardly from between the motor housing 43 and the gear head housing 14d. When no operational force is applied to the operation portion 55a, the motor lock lever 55 is held in the unlock position by a biasing force of a compression spring 56 that will be explained later. On the other hand, when an operational force is applied to the operation portion 55a to push the same rearwardly, the motor lock lever 55 moves toward the lock position. Although not shown in the drawings, a part of the output shaft 41 is cut to form a pair of flat surfaces on opposite sides with respect to the diametrical direction. This part will be hereinafter called a "flattened part." When the motor lock lever 55 reaches the lock position, the flattened part of the output shaft 41 of the electric motor 40 enters the lock recess 55b so as to be engaged therewith. With this engagement by the lock recess 55b, the output shaft 41 is prevented from rotation. As the operation portion 55a is moved forwardly to cause movement of the motor lock lever 55 from the lock position to the unlock position, the flattened part of the output shaft 41 is removed from the lock recess 55b, so that the output shaft 41 can freely rotate.

A spring storage compartment 14e is fitted into a part of the gear head housing 14d, which defines a part of the electric component storage compartment 52, so as to be positioned between the inner space of the electric component storage compartment 52 and the space for the cooling fan 41b. The compression spring 56 is stored within the spring storage compartment 14e. In this example, the compression spring 56 is a compression coil spring. The biasing lever portion 55c of the motor lock lever 55 is in contact with the front end of the compression spring 56, so that the motor lock lever 55 is biased by the compression spring 56 toward the unlock position via the biasing lever portion 55c. Therefore, the operation for moving the motor lock lever 55 toward the lock position or the operation of pushing the operation portion 55a, for example, by the fingertips of the operator is made against the biasing force of the compression spring 56. When the operator releases the pushing operation of the operation portion 55a, the motor lock lever 55 automatically returns to the unlock position by the biasing force of the compression spring 56.

A window 14f is formed in the right side wall of the spring storage compartment 14e to allow passage of air, so that the inner space of the spring storage compartment 14e communicates with the inner space of the electric component storage compartment 52.

Referring to FIG. 15, a baffle plate 43c configured as a ring-shaped wall is formed integrally with the right end surface (front end surface with respect to the axial direction) of the motor housing 43 and has an opening on its right side. The cooling fan 41b is positioned within the baffle plate 43c. Therefore, the air blown in the radial direction by the rotating cooling fan 41b is forced to flow toward the axially front side where the spring storage compartment 14e is positioned. The air then flows into the spring storage compartment 14e and further into the electric component storage compartment 52, so that the controller 50 can be cooled.

Because the controller 50 is positioned within the upper portion of the blade case 13 and around the rotary cutting blade 12, the flow of air produced by the rotation of the rotary cutting blade 12 can be used for cooling the controller 50.

In addition, the flow of air produced by the cooling fan 41b used for cooling the electric motor 40 can flow into the electric component storage compartment 52 via the spring storage compartment 52 for cooling the controller 50. The cutting tool 1 of this example is a portable circular saw having a relatively small size, in which components are efficiently arranged within limited spaces. Yet, according to this example, the controller 50 can be cooled by effectively utilizing the existing parts without need of incorporating an additional dedicated device for cooling the controller 50. Thus, the cooling structure of this example enables the controller 50 to be stored within the upper portion of the blade case 13. Therefore, the cutting tool 1 can still has a compact construction irrespective of the incorporation of the cooling structure.

Figure 8:
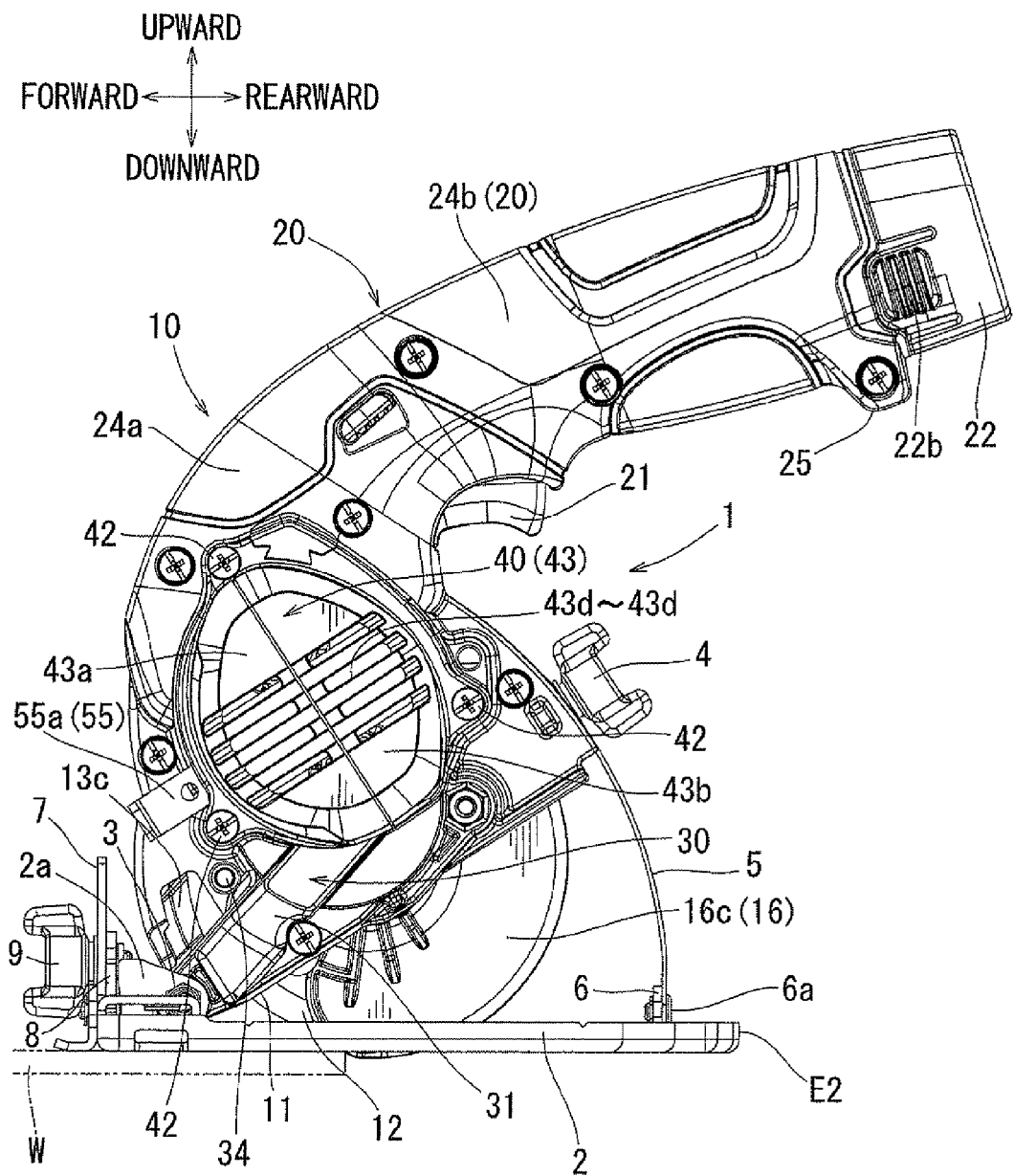
FIG. 8 is a side view of the cutting tool and showing the state where a tool unit is positioned at its uppermost position for setting a minimum cutting depth of a rotary cutting blade.

The base 2 of the cutting tool 1 of this example will now be described more in detail. As described previously, the tool unit 10 is vertically pivotally supported on the upper surface of the base 2 via the support arm 11 that is mounted to the front end of the blade case 13. Changing the vertical position of the tool unit 10 can change the downwardly protruding distance of the rotary cutting blade 12 from the lower surface of the base 2, so that the cutting depth of the rotary cutting blade 12 into the workpiece W can be changed. FIGS. 1 and 2 show the state where the tool unit 10 is positioned at the lowermost position that provides a maximum cutting depth. In contrast, FIGS. 8 and 9 show the state where the tool unit 10 is positioned at the highest position that provides a minimum cutting depth. The maximum cutting depth may be used when cutting a workpiece having a large thickness or when forming a deep groove into a workpiece. The minimum cutting depth may be used when cutting a workpiece having a small thickness or when forming a shallow groove into a workpiece.

As described previously, the vertically pivoted position of the cutting unit 10 relative to the base 2 can be fixed by tightening the manually operable screw 4 at the rear end portion of the blade case 13. As shown in FIGS. 2, 8 and 9, a depth guide 5 is mounted to the rear end of the base 2. The depth guide 5 has a thin band plate-like shape and has a lower end portion joined to a support portion 6 via a pivotal support shaft member 6a. The support portion 6 is formed on the rear end of the base 2. With this arrangement, the depth guide 5 extends upwardly from the support portion 6 and can tilt leftward and rightward relative to the base 2 about the pivotal support shaft member 6a.

A guide slot 5a is formed in the depth guide 5 and has a configuration elongated in the longitudinal direction of the depth guide 5. The manually operable screw 4 is inserted into the guide slot 5a and is threadably engaged with a corresponding threaded hole (not shown) formed in the lower end portion of the rear surface of the blade case 13. As shown in FIGS. 2 and 9, a guide recess 13d is formed in the rear surface of the blade case 13 for receiving the depth guide 5. The width of the guide recess 13d is set to be substantially equal to the width of the depth guide 5. Therefore, the depth guide 5 is received within the guide recess 13d such that the depth guide 5 may not move relative to the guide recess 13d in the widthwise direction but can smoothly move along the guide recess 13d in the lengthwise direction. As the tool unit 10 pivots upward relative to the base 2, the depth guide 5 moves downward relative to the guide recess 13d in such a manner that the depth guide 5 retracts from the guide recess 13d. On the other hand, as the tool unit 10 pivots downward relative to the base 2, the depth guide 5 moves upward relative to the guide recess 13d in such a manner that the depth guide 5 goes into the guide recess 13d. Tightening the manually operable screw 4 can fix the depth guide 5 in position relative to the guide recess 13d, so that the vertical position of the cutting unit 10 relative to the base 2 can be fixed. Therefore, the cutting depth of the rotary cutting blade 12 can be set.

In this way, the manually operable screw 4 serves as a component of a cutting depth adjusting device. When the maximum cutting depth is set as shown in FIG. 1, the manually operable screw 4 is positioned to be nearest to the base 2. When the manually operable screw 4 is at the nearest position to the base 2, there is a possibility that the operator is difficult to hold the manually operable screw 4 due to interference of his or her fingers with the base 2. Therefore, in this example, the base 2 is configured to prevent or minimize potential interference of the operator's fingers with the base 2 as will be hereinafter described.

Referring to FIGS. 2 and 9 to 11, the rear edge of the base 2 is configured such that a right half portion E1 and a left half portion E2 with respect to the width in the left and right direction are offset from each other in the forward and rearward direction. The right half portion E1 of the rear edge will be hereinafter called a "first rear edge E1", and the left half portion E2 will be hereinafter called a "second rear edge E2." In this example, the second rear edge E2 is positioned rearwardly relative to the first rear edge E1.

More specifically, in this example, the first rear edge E1 is positioned proximal to the support portion 6 that supports the depth guide 5. Therefore, when the maximum cutting depth is set, the first rear edge E1 is positioned proximal to the rear end of the blade case 13, and the manually operable screw 4 extends rearward beyond the first rear edge E1 of the base 2. With this position of the manually operable screw 4, the operator can hold the manually operable screw 4 and rotate the same without concern for the potential interference with the base 2. As a result, the operability of the cutting depth adjusting device can be improved.

Further, the length in the forward and rearward direction of the right side half having the first rear edge E1 of the base 2 is shorter than that of the left side half having the second rear edge E2. Therefore, the base 2 can be reduced in its size and weight.

As for the second rear edge E2 of the left side half of the base 2, it is not appropriate to position this edge at the same position as the first rear edge E1 for the following reason. The handle 20 is positioned above the left side half of the base 2, and therefore, if the second rear edge E2 is positioned at the same position as the first rear edge E1, the handle 20 may extend rearwardly from the second edge E2 by a large distance, resulting in that the weight balance of the cutting tool 1 is lost and the cutting tool 1 becomes unstable. In addition, the force required for the operator for supporting the tool unit 1 during the cutting operation may be increased to degrade the operability of the tool unit 1.

In contrast, according to the base 2 of this example, only the right side half having the first rear edge E1 is set to have a shorter length so as to position the first rear edge E1 at the support portion 6 for improving the operability of the manually operable screw 4, while the remaining left side half having the second rear edge E2 is set to have a longer length to position the second rear edge E2 on the rear side of the first rear edge E2. Thus, by setting the portion of the base 2 positioned downwardly of the handle 20 to have a longer length than the remaining portion, it is possible to avoid instability of the cutting tool 1 in the rearward inclining direction and to reduce the operational force (i.e., the force for supporting the cutting tool 1) required for the operator during the cutting operation. Therefore, the operability of the cutting tool 1 can be improved.

In addition, according to this example, the second rear edge E2 is set to be always positioned on the rear side of the finger contact portion 21a of the switch lever 21. Therefore, although a reaction force may be produced in a direction of moving the handle 20 downward when the operator pulls the switch lever 21 by applying his or her index finger F2 to the finger contact portion 21a, the operator can hold the cutting unit 1 in a stable position (i.e., a position where the base 2 contacts the upper surface of the workpiece W) and the cutting tool 1 may not be inclined downward.

A pivotal support wall 7 having a tilt angle scale marked thereon is formed on the front portion of the base 2. An angular guide 8 is vertically pivotally supported by the pivotal support wall 7 via a pivotal support shaft member 8a. The bracket 2a is fixedly mounted to the angular guide 8. As shown in FIG. 10, the bracket 2a is bifurcated to have a pair of tabs and is joined to the support arm 11 of the blade case 13 in such a manner that the end portion of the support arm 11 is clamped between the tabs from the left and right sides.

The pivotal support shaft member 8a of the angular guide 8a is positioned on the same axis as the pivotal support shaft member 6a positioned on the rear side. A manually operable screw 9 is inserted into an arcuate insertion slot 7a formed in the pivotal support wall 7 and is engaged with a corresponding threaded hole formed in the angular guide 8. Therefore, when the manually operable screw 9 is loosened, the angular guide 8 can pivot about an axis of the pivotal support shaft member 8a, so that the tool unit 10 can be tilted mainly rightward (i.e., a direction of moving the lower end of the rotary cutting blade 12 leftward) about the front and rear pivotal support shaft members 8a and 6a. When the manually operable screw 9 is tightened, the angular guide 8 is fixed in position, so that the tool unit 10 is fixed in the vertical position or a laterally tilt position where the tool unit 10 is tilted laterally from the vertical position by a desired angle. The laterally tilt position can be adjusted independently of the adjustment of the cutting depth.

As described previously, the movable cover 16 covers the lower part of the rotary cutting blade 12 and is gradually opened as the cutting operation proceeds. As shown in FIG. 18, in order to cover the lower portion of the rotary cutting blade 12 from the left and right sides, the movable cover 16 has a substantially U-shaped cross section and has an arcuate configuration as viewed from the lateral side. A knob 16b is formed on a right side wall portion 16a of the movable cover 16 positioned on the right side of the rotary cutting blade 12, so that the operator can manually open and close the movable cover 16 by holding the knob 16b.

An annular rotary support portion 16d is formed on an upper portion of a left side wall 16c of the movable cover 16 positioned on the left side of the rotary cutting blade 12. The rotary support portion 16d is rotatably supported on an outer circumferential surface of the boss portion 28 of the blade case 13. As described previously, the boss portion 28 rotatably supports the spindle 17. Therefore, the movable cover 16 is rotatably supported by the case body 13b of the blade case 13 about the same axis as the spindle 17.

Figure 19:
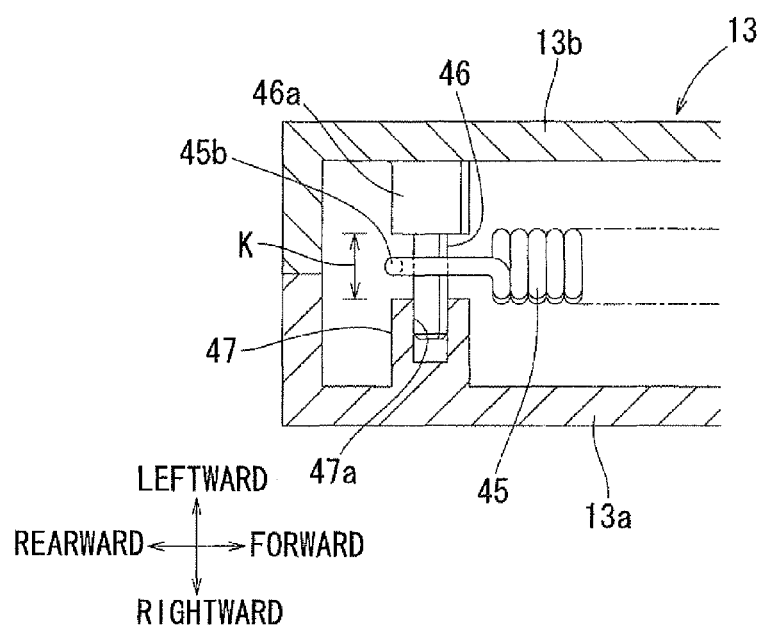
FIG. 19 is a cross sectional view taken along line (XIX)-(XIX) in FIG. 18 and showing a plan view of a spring engaging shaft for engaging a rear end of a tension coil spring.

As described previously, the tension coil spring 45 biases the movable cover 16 toward a close position for covering the lower part of the rotary cutting blade 12. To this end, a spring engaging hole 16e is formed in the outer peripheral portion of the rotary support portion 16d for engaging a first end portion 45a of the tension coil spring 45. A second end portion 45b opposite to the first end portion 45a of the tension coil spring 45 is engaged with the blade case 13. More specifically, as shown in FIG. 19, a spring engaging shaft 46 extends from the case body 13b of the blade case 13. The spring engaging shaft 46 is inserted into a boss hole 47a of a boss portion 47 provided adjacent to the rear end portion of the case body 13b. In this example, both of the case body 13b and the case cover 13a are made of resin. The spring engaging shaft 46 is molded integrally with the case body 13b and the boss portion 47 is molded integrally with the case cover 13a. Therefore, as the case cover 13a is assembled with the case body 13b, the spring engaging shaft 46 is inserted into the boss hole 47a, so that the case cover 13a can be positioned relative to the case body 13b.

A stepped portion 46a is formed on the base portion of the spring engaging shaft 46 and has a diameter larger than the remaining portion of the spring engaging shaft 46. As shown in FIG. 19, the length of the stepped portion 46a and the length of the boss portion 47 are determined such that a clearance K is formed between the stepped portion 46a and the boss portion 47 when the case cover 13a is assembled with the case body 13b. A part of the spring engaging shaft 46 exposed at the clearance K between the stepped portion 46a and the boss portion 47 is used for engaging the second end portion 45b of the tension coil spring 45.

In this way, the second end portion 45b of the tension coil spring 45 is engaged with the spring engaging shaft 46, and therefore, the assembling operation of the tension coil spring 45 can be easily performed in comparison with the case that the second end portion 45b is engaged with a hole.

In this example, a wire having a diameter of 0.4 mm is used for the tension coil spring 45. In this connection, the clearance K is set to be about 1 mm and is slightly larger than the wire diameter of the tension coil spring 45. Therefore, the operation for engaging the second end portion 45b of the tension coil spring 45 with the spring engaging shaft 46 can be easily performed, and the movement of the second end portion 45b in the axial direction (vertical direction as viewed in FIG. 19) can be minimized.

In the case of the cutting tool 1 having a relatively small size, the tension coil spring 45 for biasing the movable cover 16 toward the close position is normally mounted to a position at the back within the blade case 13. It may not be easy for the operator to extend his or her hand to the back within the blade case 13 or to look into the back within the blade case 13. Therefore, the mounting operation of the tension coil spring 45 cannot be easily made without incorporation of the above improvement. Thus, according to this example, the second end portion 45b of the tension coil spring 45 is not necessary to be engaged with a hole or to be fixed by using a screw or the like. Instead, the second end portion 45b can be engaged with the spring engaging shaft 46. In other words, the second end portion 45b can be simply hooked on the spring engaging shaft 46. Therefore, the mounting operation of the tension coil spring 45 can be easily performed.

In addition, because the function for positioning between the blade case halves (i.e., the case cover 13a and the case body 13b) is given to the spring engaging shaft 46 by utilizing the two-sprit construction of the blade case 13, the construction and the assembling operation of the cutting tool 1 can be simplified.

Further, because the opposite ends of the spring engaging shaft 46 is supported between the case cover 13a and the case body 13b, it is possible to prevent the second end portion 45b of the tension coil spring 45 from being accidentally removed from the spring engaging shaft 46 after the second end portion 45b has been engaged with the spring engaging shaft 46.

The above example can be modified in various ways. For example, in the above example, the cutting tool 1 is configured as a battery driven cutting tool receiving a supply of power from the battery pack 22 that is mounted to the rear end portion of the handle 20. However, the cutting tool 1 may be configured to be driven by an AC power. Further, the construction of the handle 20 of this example can be applied to handles of any other cutting tools, such as a medium-size cutting tool and a large-size cutting tool, other than a small-size cutting tool as in this example.

Further, although the motor housing 43 of the electric motor 40 has a two-split construction that does not need for setting a draft angle to the motor housing 43, it may be possible that the motor housing 43 does not have a two-split construction but requires a draft angle. However, in this case, the motor housing 43 may still have a horizontally flattened cylindrical tubular shape, so that the electric motor 40 can be used as a sub-grip.

Furthermore, although the handle 20 and the electric motor 40 are arranged for being grasped by the right hand RH and the left had LH, respectively, this arrangement can be reversed such that the handle 20 and the electric motor 40 can be grasped by the left hand LH and the right had RH, respectively.

What is claimed is:
1. A cutting tool comprising:
a base for placing on a workpiece;
a tool unit supported on an upper side of the base and having an electric motor, a rotary cutting blade rotatably driven by the electric motor, and a blade case covering an upper portion of the rotary cutting blade;
an electric component molded with a control circuit board to have a flat plate shape is disposed within the blade case and cooled by a flow of air produced by the rotation of the rotary cutting blade, wherein the electric component is a controller that can control the electric motor;

an electric component storage compartment that accommodates the electric component and that is disposed within an upper portion of the blade case; and
a fan producing a flow of cooling air for cooling the electric motor and the electric component, wherein:
the electric component storage compartment extends along a direction substantially parallel to an axial direction of the fan, and
the electric component storage compartment is separated from an internal space of the blade case by a partition wall and is located on an upper side of a rotational axis of the fan.

2. The cutting tool as in claim 1, further comprising:
a motor lock lever operable for locking rotation of an output shaft of the electric motor;
a spring biasing the motor lock lever toward an unlock direction; and
a spring storage compartment storing the spring and disposed between the electric component storage compartment and the fan;
wherein a window is formed in the spring storage compartment and communicating between inside of the electric component storage component and the inside of the spring storage compartment, so that a flow of the cooling air produced by the fan is introduced into the electric component storage compartment via the spring storage compartment.

3. The cutting tool as in claim 2, wherein the electric component storage compartment is made of resin and formed integrally with the blade case.

4. The cutting tool as in claim 2, wherein the electric component storage compartment protrudes into a space within the blade case from an outer wall of the blade case.

5. The cutting tool as in claim 4, wherein the electric component storage compartment and the spring storage compartment are arranged along a direction substantially parallel to an axial direction of the fan.

6. The cutting tool as in claim 5, further comprising a baffle plate disposed on a downstream side of the fan, wherein the spring storage compartment is arranged proximal to the baffle plate.

7. The cutting tool as in claim 2, wherein the electric component storage compartment and the spring storage compartment are positioned proximal to each other within the blade case.

8. The cutting tool as in claim 7, wherein the spring storage compartment has a longitudinal direction and the spring is received within the spring storage compartment while an axial direction of the spring is oriented toward the longitudinal direction of the spring storage compartment.

9. The cutting tool as in claim 8, wherein the spring storage compartment has opposite walls in a direction parallel to the axial direction of the fan, and inlet and outlet openings for the cooling air are formed in the opposite walls.

10. The cutting tool as in claim 9, wherein the inlet of the spring storage compartment is opposed to the fan in the axial direction, and the outlet of the spring storage compartment is opposed to the electric component storage compartment in the axial direction.

11. The cutting tool as in claim 10, wherein the flow of air produced by the fan is formed to flow in the axial direction by a baffle plate, and the spring storage compartment is opposed to an outer peripheral portion of the baffle plate in the axial direction.

12. The cutting tool as in claim 1, further comprising:
a reduction gear mechanism transmitting rotation of the motor to the rotary cutting blade, wherein the reduction gear mechanism is disposed within the blade case and the electric component storage compartment is located on an upper side of the reduction gear mechanism.

13. The cutting tool as in claim 1, further comprising:
a handle extending from an upper portion of the blade case, wherein the electric component storage compartment is disposed proximal to one end on a side of the blade case of the handle.

14. A cutting tool comprising:
a tool unit including an electric motor, a rotary cutting blade rotatably driven by the electric motor, and a blade case covering at least a part of the rotary cutting blade;
an electric component storage compartment disposed within an upper portion of the blade case and storing an electric component molded with a control circuit board to have a flat plate shape, wherein the electric component is a controller that can control the electric motor; and
a fan producing a flow of cooling air for cooling the electric motor and the electric component, wherein:
the electric component storage compartment extends along a direction substantially parallel to an axial direction of the fan, and
the electric component storage compartment is separated from an internal space of the blade case by a partition wall and is located on an upper side of a rotational axis of the fan.

15. The cutting tool as in claim 14, wherein the electric component storage compartment is made of electrical and thermal insulation material.

16. The cutting tool as in claim 15, wherein the electrical and thermal insulation material is resin.

17. The cutting tool as in claim 14, wherein the electric component storage compartment is formed integrally with the blade case.

18. The cutting tool as in claim 14, further comprising an air introduction device introducing the flow of air produced by the fan into the electric component storage compartment.

19. The cutting tool as in claim 14, wherein the electric component storage compartment protrudes into a space within the blade case from an outer wall of the blade case.

20. A cutting tool comprising:
a tool unit including an electric motor, a rotary cutting blade rotatably driven by the electric motor, and a blade case covering at least a part of the rotary cutting blade;
an electric component molded with a control circuit board to have a flat plate shape is disposed within the blade case at a position capable of being cooled by a flow of air produced by the rotation of the rotary cutting blade, wherein the electric component is a controller that can control the electric motor;
an electric component storage compartment that accommodates the electric component and that is disposed within an upper portion of the blade case; and
a fan producing a flow of cooling air for cooling the electric motor and the electric component, wherein:
the electric component storage compartment extends along a direction substantially parallel to an axial direction of the fan, and
the electric component storage compartment is separated from an internal space of the blade case by a partition wall and is located on an upper side of a rotational axis of the fan.

21. The cutting tool as in claim 20, wherein the electric component storage compartment protrudes into a space within the blade case from an outer wall of the blade case.

* * * * *